W. L. SWIFT & E. L. RELLER.
TICKET ISSUING AND REGISTERING MACHINE.
APPLICATION FILED AUG. 9, 1913.

1,160,669.

Patented Nov. 16, 1915.
9 SHEETS—SHEET 1.

Witnesses:
Harry H. Peiss.
George G. Anderson.

Inventors:
William L. Swift and Edwin L. Reller,
By Hugh K. Wagner
Their Attorney.

W. L. SWIFT & E. L. RELLER.
TICKET ISSUING AND REGISTERING MACHINE.
APPLICATION FILED AUG. 9, 1913.

1,160,669.

Patented Nov. 16, 1915.
9 SHEETS—SHEET 4.

Fig. 4.

Witnesses:
Harry H. Reiss
George G. Anderson

Inventors:
WILLIAM L. SWIFT AND EDWIN L. RELLER,
By Hugh K. Wagner,
Their Attorney.

W. L. SWIFT & E. L. RELLER.
TICKET ISSUING AND REGISTERING MACHINE.
APPLICATION FILED AUG. 9, 1913.

1,160,669.

Patented Nov. 16, 1915.
9 SHEETS—SHEET 6.

Witnesses:
Harry H. Reiss.
George G. Anderson.

Inventors:
WILLIAM L. SWIFT AND EDWIN L. RELLER,
By Hugh K. Wagner,
Their Attorney.

W. L. SWIFT & E. L. RELLER.
TICKET ISSUING AND REGISTERING MACHINE.
APPLICATION FILED AUG. 9, 1913.
1,160,669.
Patented Nov. 16, 1915.
9 SHEETS—SHEET 7.
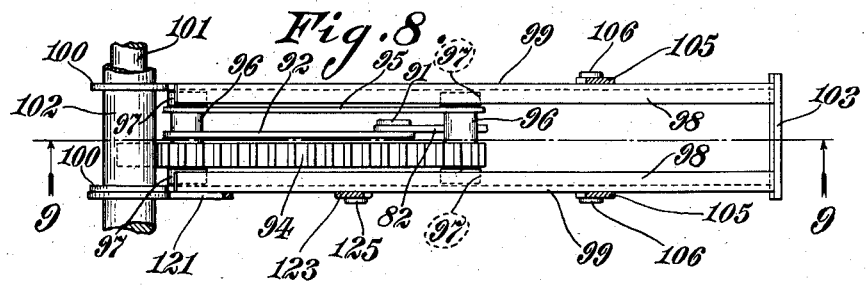
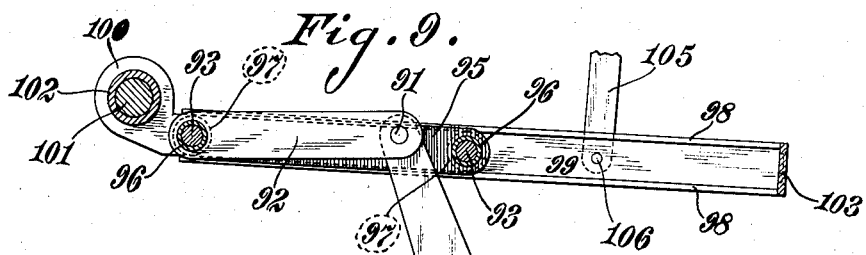
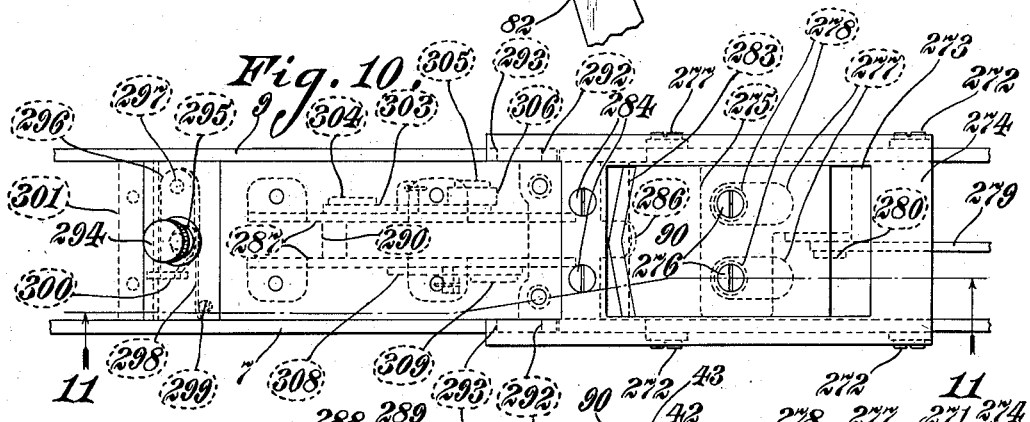
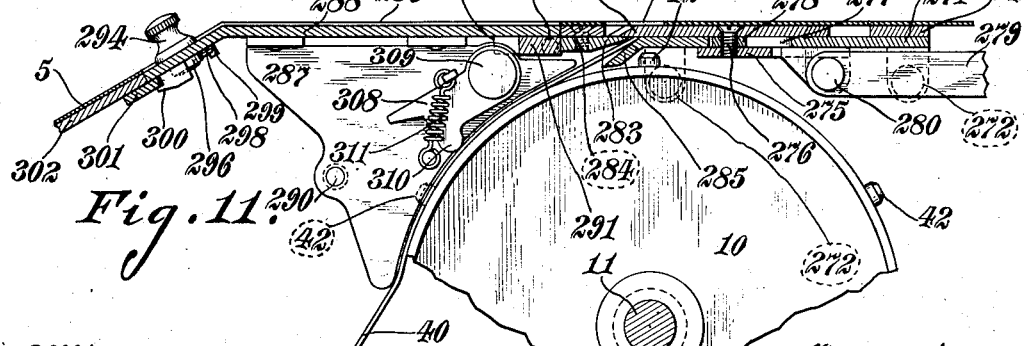

W. L. SWIFT & E. L. RELLER.
TICKET ISSUING AND REGISTERING MACHINE.
APPLICATION FILED AUG. 9, 1913.
1,160,669.
Patented Nov. 16, 1915.
9 SHEETS—SHEET 8.
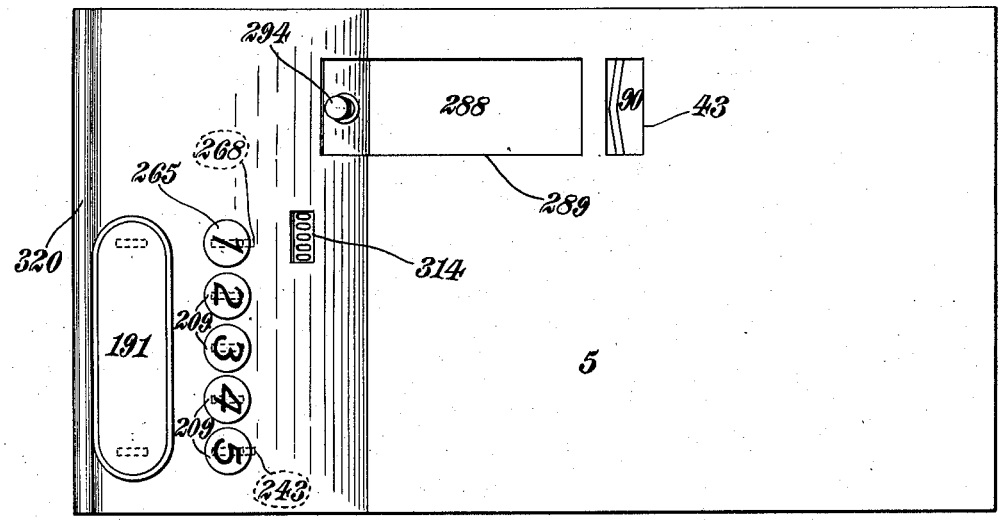
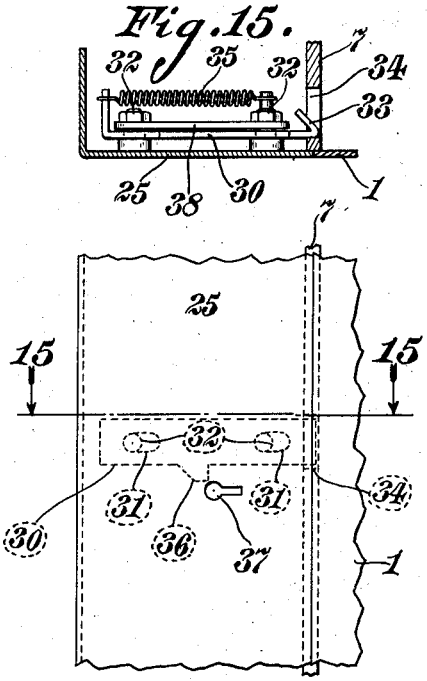
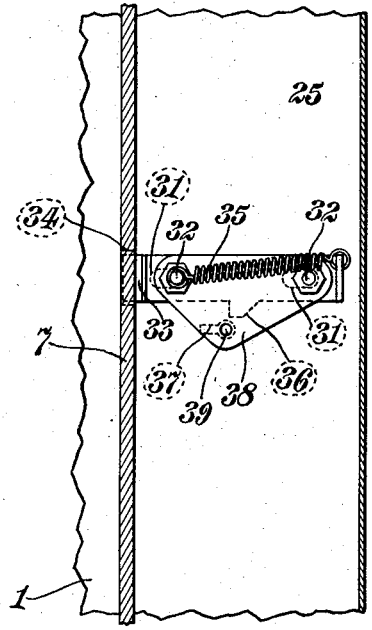
Witnesses:
Harry H. Peirce.
George G. Anderson.
Inventors:
WILLIAM L. SWIFT AND EDWIN L. RELLER,
By Hugh K. Wagner
Their Attorney.

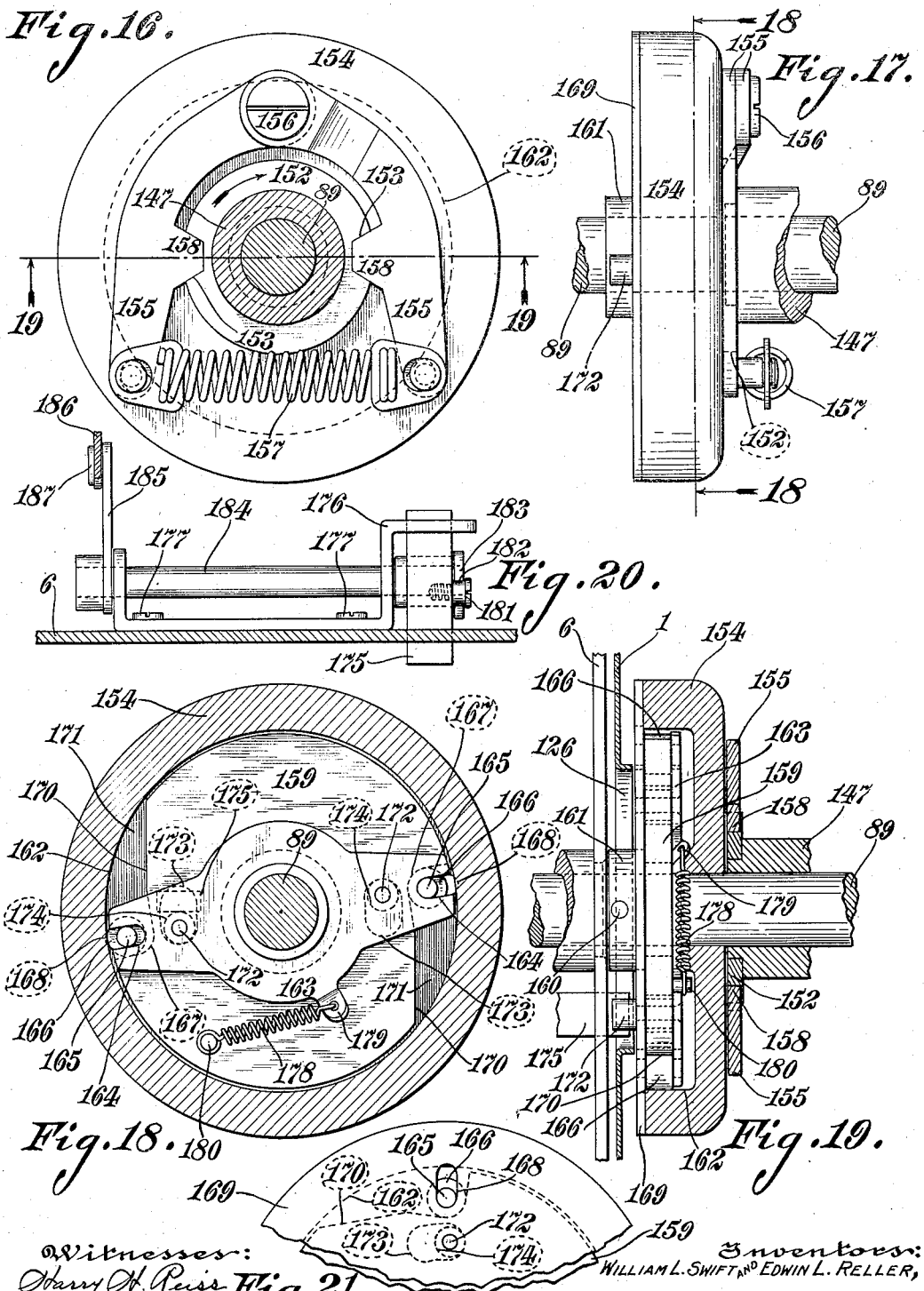

UNITED STATES PATENT OFFICE.

WILLIAM L. SWIFT, OF ST. LOUIS, MISSOURI, AND EDWIN L. RELLER, OF PORTLAND, OREGON, ASSIGNORS TO THE TEMCO MANUFACTURING COMPANY, OF ST. LOUIS, MISSOURI, A CORPORATION OF MISSOURI.

TICKET ISSUING AND REGISTERING MACHINE.

1,160,669.   Specification of Letters Patent.   Patented Nov. 16, 1915.

Application filed August 9, 1913.  Serial No. 783,871.

*To all whom it may concern:*

Be it known that we, WILLIAM L. SWIFT and EDWIN L. RELLER, citizens of the United States, said WILLIAM L. SWIFT residing at the city of St. Louis, State of Missouri, and said EDWIN L. RELLER residing at the city of Portland, in the county of Multnomah and State of Oregon, have invented certain new and useful Improvements in Ticket Issuing and Registering Machines, of which the following is a specification.

This invention relates to ticket-issuing and registering machines which are particularly adapted for use in box offices of theaters, baseball grounds, parks, and the like, in ticket offices of elevated, subway, and other railways, and, also, in restaurants, cafés, lunch rooms, and other eating places, and has for its object to provide a generally improved machine of this character that embodies novel improvements over the machine disclosed in United States Letters-Patent No. 1,039,167, granted to Albert J. Meier and William L. Sullivan, September 24, 1912.

Further, the present invention consists of the novel features of construction and arrangement of parts hereinafter more fully described and pointed out in the claims.

Figure 1:
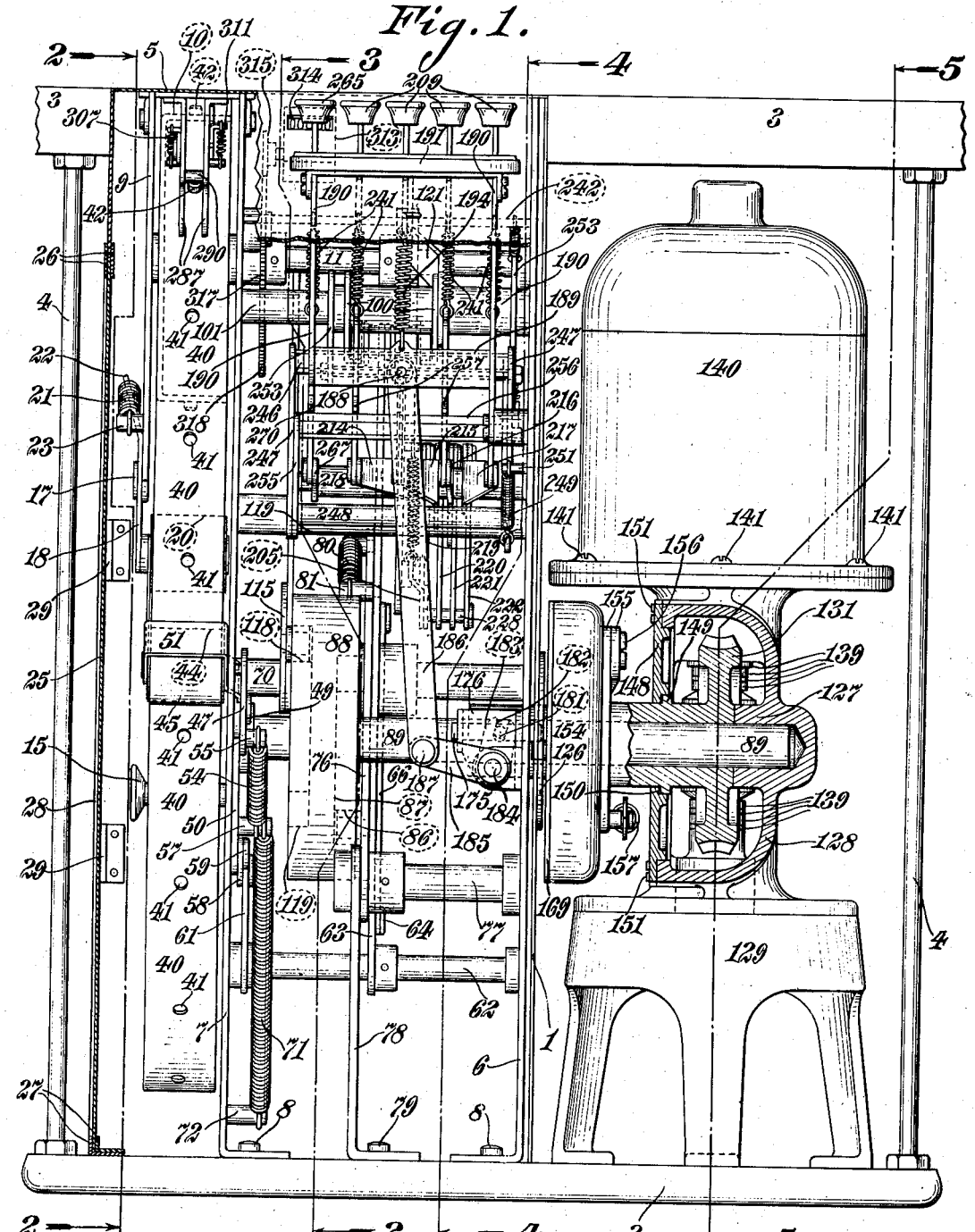
Figure 2:
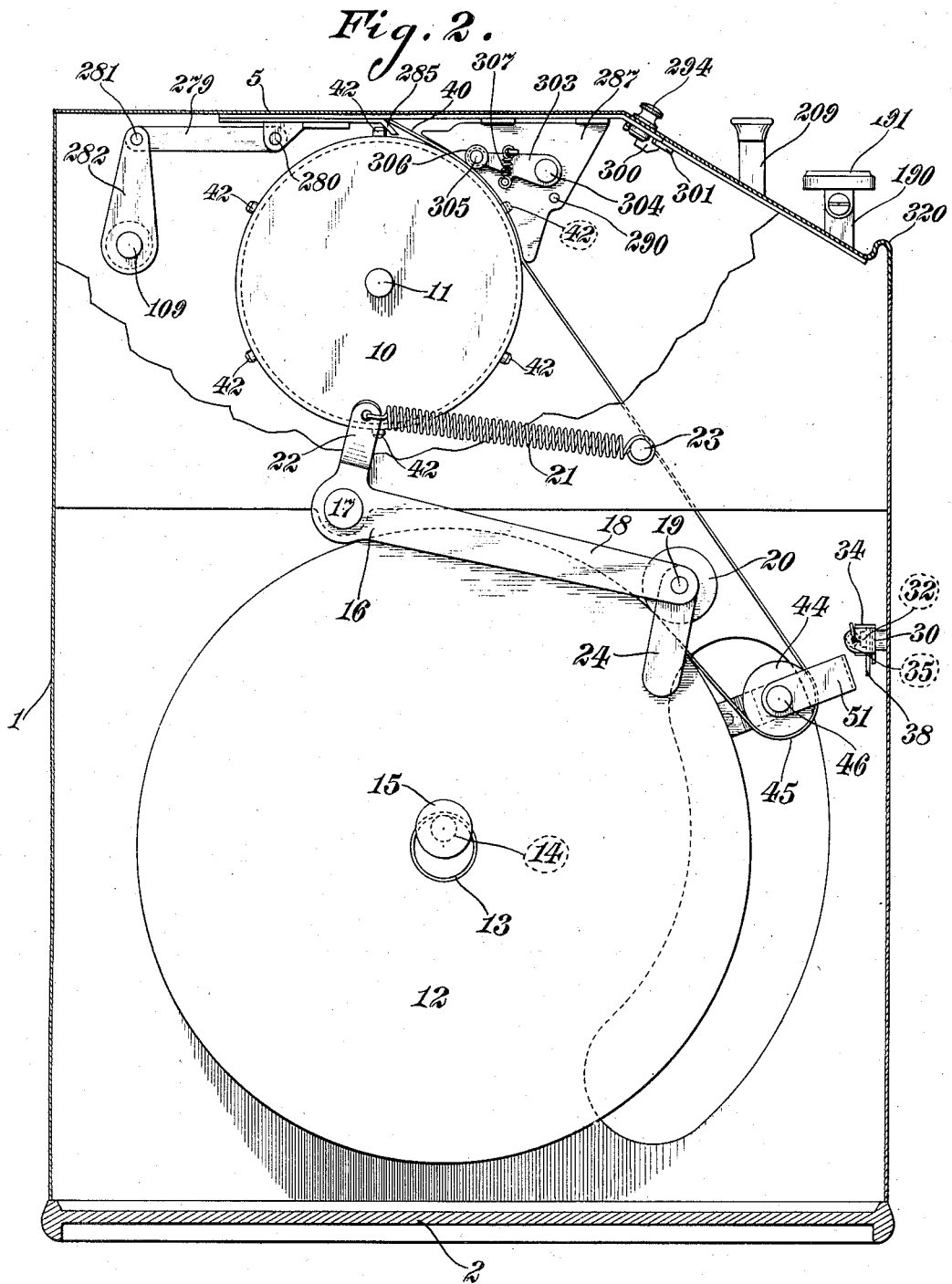
Figure 3:
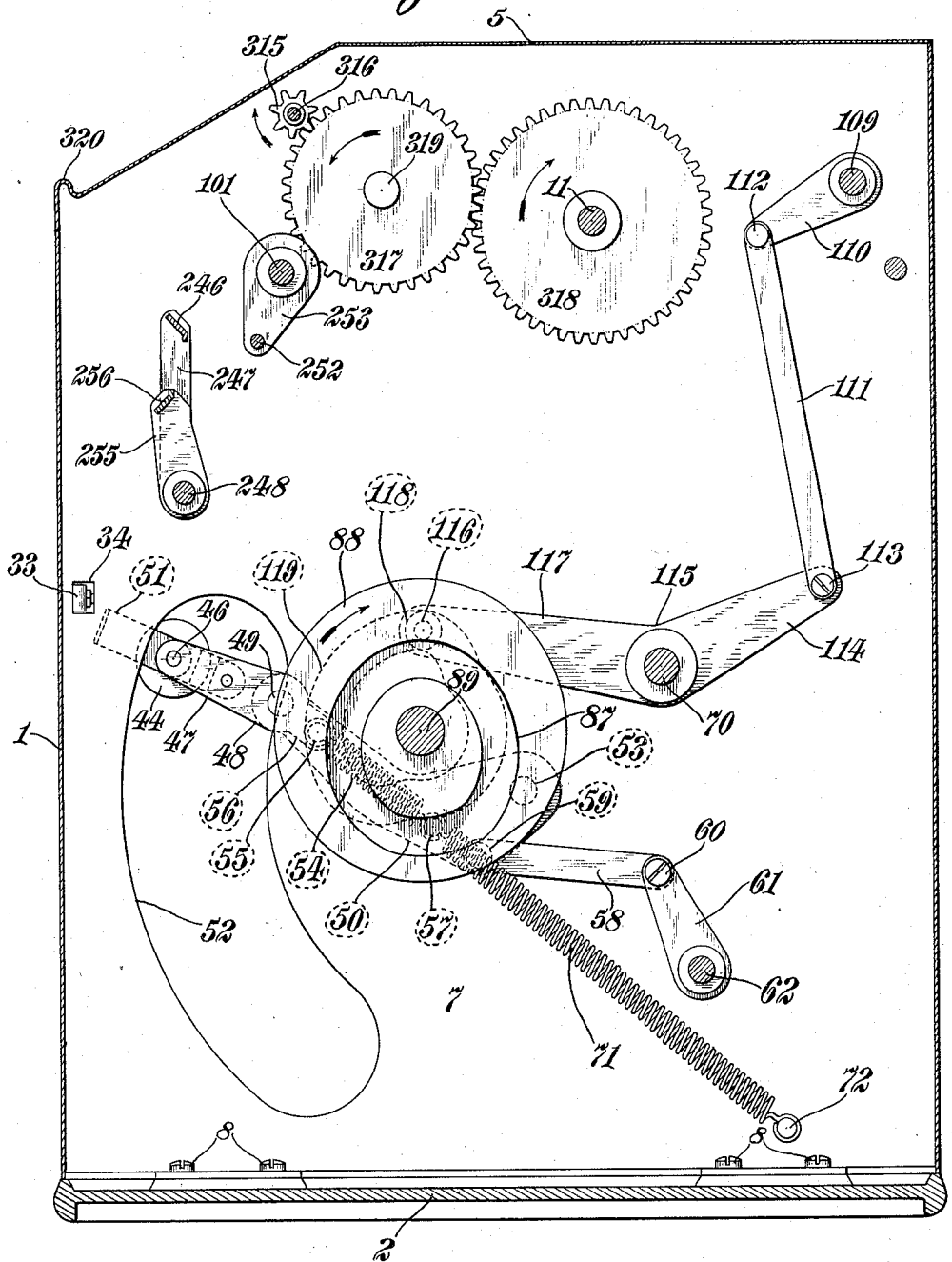
Figure 5:
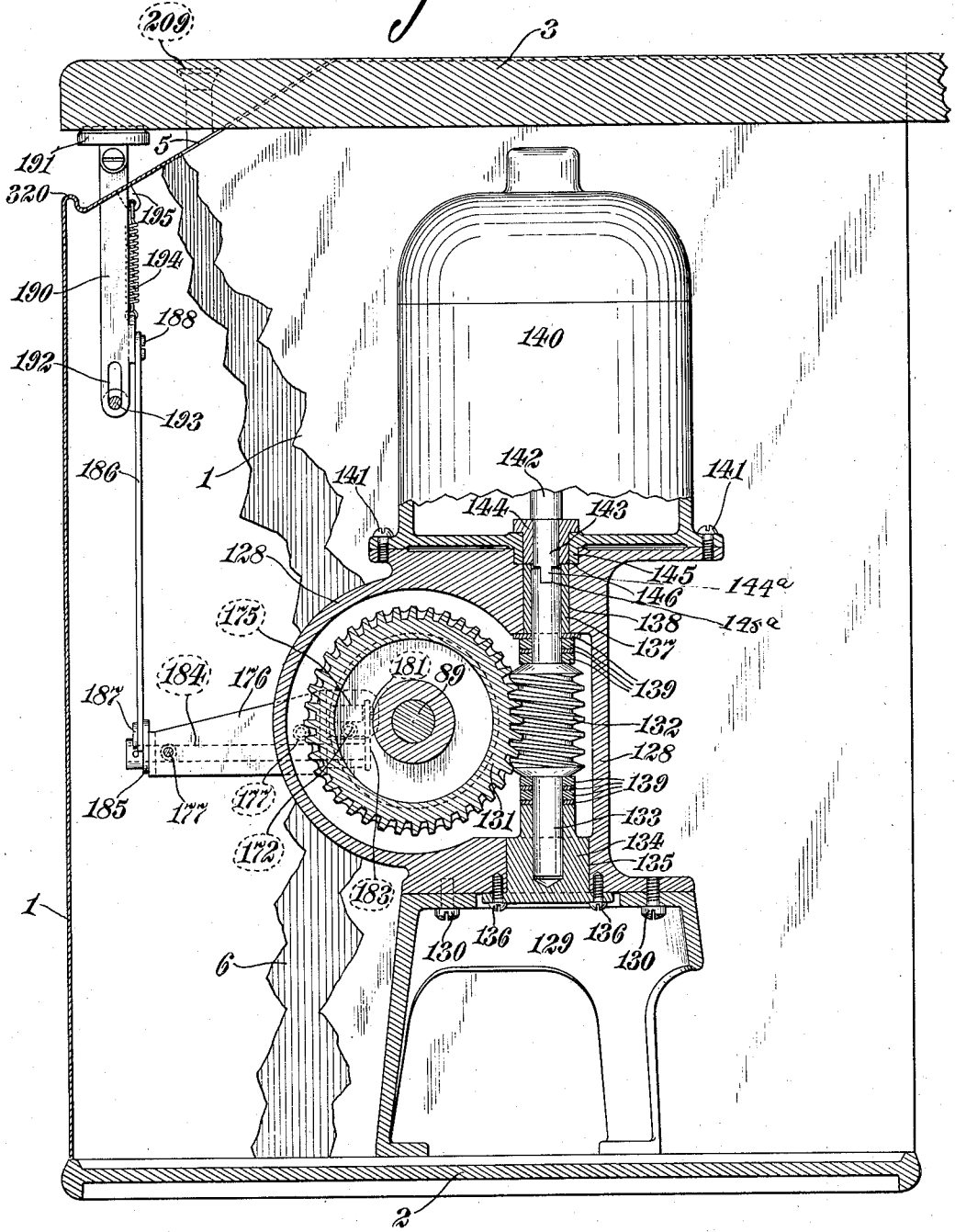
Figure 6:
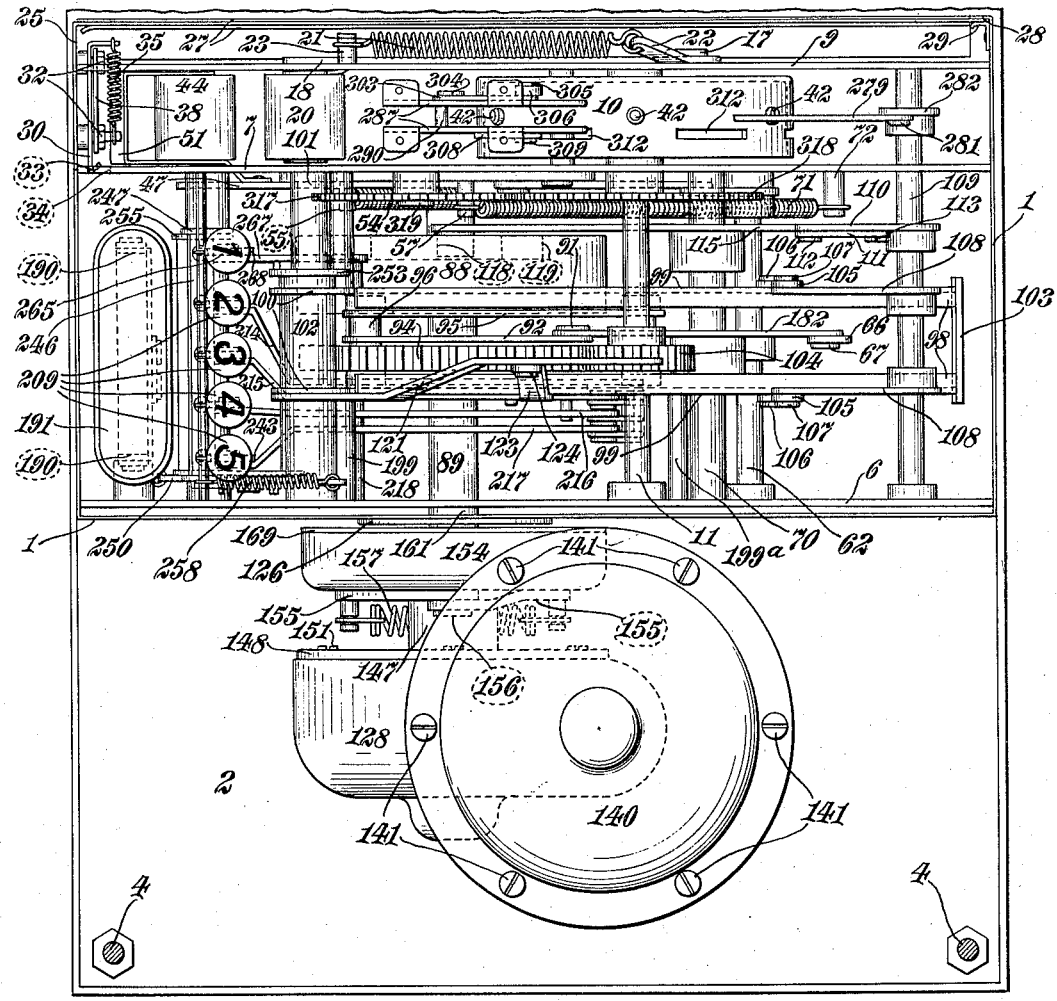
Figure 7:
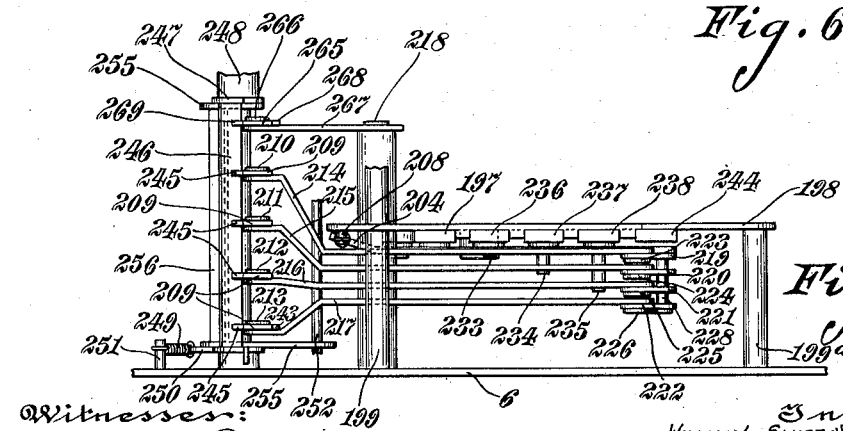

In the accompanying drawings forming part of this specification, in which like numbers of reference denote like parts wherever they occur, Figure 1 is a front elevation of a machine embodying the present invention, part of the front casing being broken away to expose the internal parts; Fig. 2 is a sectional view on the line 2—2, Fig. 1; Fig. 3 is a sectional view on the line 3—3, Fig. 1; Fig. 4 is a sectional view on the line 4—4, Fig. 1; Fig. 5 is a sectional view on the line 5—5, Fig. 1; Fig. 6 is a top plan view of the machine with the top plate removed; Fig. 7 is a top plan view of the stops for limiting the movement of the rack bar; Fig. 8 is a top plan view of the rack bar and carriage and supporting frame; Fig. 9 is a sectional view on the line 9—9, Fig. 8; Fig. 10 is a top plan view, on an enlarged scale, of the knife; Fig. 11 is a sectional view on the line 11—11, Fig. 10; Fig. 12 is a top plan view of the top plate; Fig. 13 is a rear elevation of the lock; Fig. 14 is a front elevation of same; Fig. 15 is a sectional view on the line 15—15, Fig. 14; Fig. 16 is an exterior face view of the clutch casing; Fig. 17 is a front elevation of same; Fig. 18 is a sectional view on the line 18—18, Fig. 17; Fig. 19 is a sectional view on the line 19—19, Fig. 18; Fig. 20 is a top plan view, on an enlarged scale, of the rock-shaft for operating the clutch stop; and Fig. 21 is a fragmentary face view of the cover plate for the clutch casing.

The casing 1 of the machine is supported on a base plate or board 2. This base plate or board 2 is preferably arranged to extend beyond both sides of the casing 1 and is supported from the counter or desk 3 by suspension rods 4 or other suitable means, the counter or desk 3 having an opening to receive the upper end of the casing 1 and the top plate 5 of the casing being substantially flush with the upper surface of said counter or desk. Said casing 1 incloses most of the moving parts of this machine, those only projecting therefrom to which access is necessary for its normal operation. Plates 6 and 7, which are located within the casing 1 and are secured to the base plate 2 by screws 8 or other suitable means, stand in spaced parallel relation upon the base plate and extend upwardly to the top plate 5 of the casing, most of the operating mechanism being located between and supported by said plates 6 and 7. A plate 9, which depends from the top plate 5 of the casing, is relatively shorter than the plate 7 and is arranged in spaced parallel relation with said plate 7, the ticket-feeding drum 10 being located between the plates 7 and 9 and being rigidly mounted on the shaft 11, which is revolubly supported by the plates 6, 7, and 9.

A ticket roll 12, which is wound on a hollow core 13, is located directly below the ticket-feeding drum 10 and is revolubly mounted on a pin 14, which is secured to the plate 7, the outer end of said pin being provided with a button or head 15, which is adapted to prevent the roll 12 from accidentally sliding off the pin 14 and is slightly smaller in diameter than the core 13 so as to allow said roll to be mounted upon the pin 14 in the usual manner.

A bell-crank 16 is pivotally attached at 17 to the plate 9, and the arm 18 of same bears a pin 19 on which a roller 20 is rotatably mounted, which roller rides upon the ticket roll 12. A spring 21, which is attached to the arm 22 of bell-crank 16 and, also, to a pin 23 secured to plate 9, tends to rotate said bell-crank clockwise, Fig. 2, and thereby holds the roller 20 in engagement with the ticket roll 12, so as to prevent the ticket roll from unwinding too freely and, also to prevent backlashing of the strip of tickets that constitutes the ticket roll.

A guard 24, which is rigidly mounted on pin 19, overlaps the side of the ticket roll 12 and thereby affords additional means for holding same in place on the pin 14. When it is desired to mount a fresh ticket roll 12 upon the pin 14, it is necessary to hold the arm 18 of bell-crank 16 in a raised position, and, after the fresh ticket roll is mounted on the pin 14, the arm 18 is lowered until the roller 20 rests upon the ticket roll and the guard 24 overlaps the side of the ticket roll, the end of said guard being bent outwardly to allow same to find its place readily adjacent to the side of the ticket roll. As the ticket roll 12 becomes smaller by virtue of the issuance of tickets therefrom, the spring 21 rotates the bell-crank 16 clockwise, Fig. 2, and thereby causes the roller 20 to ride upon the ticket roll 12 until the latter has become exhausted.

A door 25, which is preferably L-shaped in horizontal cross-sectional configuration, partly incloses the ticket roll 12, the upper edge of its side being slidably held in the space between a pair of strips 26 secured to the side of the casing 1, the lower edge of its side being slidably held in the space between the angle-plates 27 secured to the base plate 1, the rear edge of its side being adapted to fit between the forwardly-projecting edge 28 of the back of the casing 1 and the angle-plate or angle-plates 29 secured to the back of the casing, and the front of the door being adapted to register in the plane of the front of the casing when the door is closed. In order to lock the door in its closed position, same is provided with a plate 30, which is slotted at 31 to allow bolts 32 to pass therethrough, said bolts being preferably secured to the rear face of the front of the door. The plate 30 is adapted to slide longitudinally, and has an inwardly-bent hook-like end 33, which seats in an opening 34 in the plate 7, when the door is closed, a spring 35, which is attached to the other end of said plate 30 and one of the bolts 32, tending to hold the plate 30 normally in the position to cause the end 33 to seat in said opening.

A projection 36 borne by the plate 30 extends adjacent to a key-hole 37 in the front of the door, and a plate 38, which is supported by the bolts 32, has an aperture 39 that affords a means for centering a key (not shown in the drawings) within the key-hole 37. When a key is inserted through the key-hole 37 and turned therein, one side of said key engages the projection 36 on the plate 30, with the result that said plate slides toward the left, Figs. 14 and 15, thereby drawing the end 33 out of the opening 34 and allowing the door to be drawn forwardly and removed.

The roll 12 consists of a continuous strip of paper, or the like, having the separate tickets 40 printed either on one or both sides thereof so that, when the machine issues a ticket or a plurality of tickets, same will bear the customary subject-matter. The strip of paper is provided with a plurality of ticket-feeding perforations 41 which may be located on the lines of juncture of the tickets as depicted in Fig. 1, or elsewhere. The perforations 41 permit the pins 42 borne by the drum 10 to enter same for the purpose of feeding a ticket 40 or a plurality of said tickets through the opening 43 in the top plate 5 of the casing as hereinafter described, said pins being arranged in annular alinement and being predeterminedly and accurately spaced apart with substantially the same spacing as the perforations 41. The loose end of the strip of tickets that extends from the ticket roll 12 passes underneath a roller 44, forming a loop 45 through which said roller extends, and then the strip extends upwardly from said roller and passes over the feeding drum 10, the roller 44 being revolubly mounted on a pin 46 borne by the arm 47 of a bell-crank 48, which is pivoted at 49 to a member 50. The pin 46 extends through openings in the sides of a U-shaped guide 51 and, also, through an arcuate opening 52 in the plate 7, and one of the sides of said guide is bent so as to extend through said opening 52 and is riveted or otherwise secured to the arm 47 of bell-crank 48. The strip of tickets passes between the sides of the guide 51 and is thereby prevented from sliding off either end of the roller 44. The member 50 is preferably located between the plates 6 and 7 and adjacent to the plate 7, being rotatably mounted on stud 53, which is secured to said plate 7 and is preferably located in axial alinement with the pin 14.

A spring 54, which is attached at one end to a pin 55 borne by the arm 56 of bell-crank 48 and at the other end to a pin 57 borne by member 50, holds said bell-crank normally in the position depicted in Fig. 3, so that the axis of said spring passes through the pivot 49.

A link 58 having one end pivotally attached at 59 to the member 50 and the other end pivotally attached at 60 to the arm 61 rigidly mounted on shaft 62 holds the member 50 normally in the position depicted in Fig. 3, said shaft being revolubly supported by the plates 6 and 7 and having an arm 63 rigidly mounted thereon. The arm 63 bears a stud 64, which extends through a slot 65 in a link 66, the latter being pivotally attached at 67 to the arm 68 of a bell-crank 69, which is revolubly mounted on shaft 70 supported by the plates 6 and 7.

A spring 71, which is attached at one end to the pin 57 borne by member 50 and at the other end to pin 72 secured to plate 7, tends to rock the member 50 counter-clockwise, Fig. 3, and thereby causes the stud 64 borne by arm 63 to seat in the lower end of the slot 65 in link 66 through the medium of link 58, arm 61, and shaft 62. When the bell-crank 69 is rocked clockwise, Fig. 4, on shaft 70 in the manner hereinafter described, the arm 68 of the former moves the link 66 downwardly, whereupon the pull of spring 71 rocks the member 50 counter-clockwise, Fig. 3, whereby the bell-crank 48 moves downwardly with the free end of the member 50 and causes the roller 44 to pull upon the strip of tickets, with the result of unwinding some of the ticket strip from the roll 12 preparatory to the feeding operation. While the feeding operation takes place, the bell-crank 69 is rocked counter-clockwise, Fig. 4, whereby the arm 68 thereof pulls the link 66 upwardly and thereby causes the arm 63 to rock the shaft 62 counter-clockwise, with the result that the arm 61 rocks the member 50 clockwise, Fig. 3, to its initial position, moving the roller 44 upwardly in advance of the loop 45 so as to prevent said roller from retarding the upward movement of the loop 45. The strip of tickets that extends from the roll 12 to the feeding drum is thus allowed to become slack, so as to prevent the pins 42 borne by said drum from tearing or mutilating the tickets during the feeding operation.

A plate 73, which is revolubly mounted on the shaft 70 adjacent to the bell-crank 69, bears a segmental rack 74, which meshes with a segmental rack 75 on plate 76, the latter being mounted on shaft 77, which is revolubly supported by plate 6 and the standard 78 secured to the base plate 2 by screws 79 or other suitable means. A spring 80 attached at one end to a pin 81 borne by the arm 82 of bell-crank 69 and at the other end to a pin 83 borne by the plate 73 tends to rock the bell-crank 69 clockwise, Fig. 4, and thereby holds the pin 81 normally in engagement with a projection or shoulder 84 on plate 73. A pin 85 borne by plate 67 has an antifriction roller 86 revolubly mounted thereon, which roller extends into and rides in a cam groove 87 in one side of a member 88, which is rigidly mounted on the operating shaft 89, the latter being revolubly supported by the plates 6 and 7 and being rotated in the direction indicated by the arrow, Fig. 4, through substantially a complete revolution to issue a ticket or a plurality of tickets from the machine in the manner hereinafter described.

The parts just described stand normally in the positions depicted in Fig. 4, and when the shaft 89 is rotated through approximately the first third of a revolution, the roller 86 travels through an eccentric portion of the cam groove 87 and thereby rocks the plate 76 counter-clockwise, whereby the latter causes the plate 73 to rock clockwise through the medium of the segmental racks 75 and 74 and the spring 80 causes the bell-crank 69 to rock clockwise, with the result that the arm 68 causes the link 66 to descend for the purpose hereinabove described and the arm 82 sets the drum-rotating mechanism hereinafter described. During approximately the next one-sixth of the revolution of the shaft 89, the roller 86 travels through a concentric portion of the cam groove 87, whereby the plate 76 holds the plate 73 temporarily in the position to which same has been moved by the plate 76, and the bell-crank 69 stands temporarily in the position to which same has been moved by the pull of spring 80, the setting of the knife 90 to uncover the opening 43 as hereinafter described being effected during this particular movement of the operating shaft. During approximately the next three-eighths of the revolution of the shaft 89, the roller 86 travels through a second eccentric portion of the cam groove 87 and thereby rocks the plate 76 clockwise, Fig. 4, to its initial position, whereby the latter rocks the plate 73 counter-clockwise to its normal position through the medium of the segmental racks 75 and 74, and the shoulder 84 on the plate 73 pushes against the pin 81 borne by the arm 82 of bell-crank 69 so as to rock the latter counter-clockwise to its initial position, thus pulling the link 66 upwardly for the purpose hereinabove described. This restoration of the bell-crank 69 to its initial position effects the actuation of the drum-rotating mechanism to rotate the drum 10 sufficiently to feed a ticket or a plurality of tickets from the machine. While the shaft 89 is rotated through the last portion necessary to complete one revolution of same, the roller 86 rides through a second concentric portion of the cam groove 87, thereby holding the plate 76 and the parts in connection with the latter in their normal positions. During this last movement of the shaft 89, the knife 90 is actuated in the manner hereinafter described, to cover the opening 43 and thereby to sever the issued ticket or tickets from the strip within the machine. At the completion of a revolution of the shaft 89, the roller 86 is left in its initial position at the entrance to the first eccentric portion of the cam groove 87 as depicted in Fig. 4.

The end of the arm 82 of the bell-crank 69 is pivotally attached at 91 to the rear end of a link 92, and the forward end of the latter is pivotally connected to one of the rods or axles 93, preferably the front one, of a carriage that includes a rack bar 94 and a plate 95 connected at their ends by said rods or axles 93, respectively, and spaced apart in substantially parallel relation by spacing sleeves 96 on said rods or axles. Rollers 97 revolubly mounted on the ends of the rods 93 extend between the flanges 98 of a pair of channel-iron mmbers 99 and rest upon the lower flanges 98, said members 99 being arranged in substantially parallel relation with their flanges 98 pointing inwardly to form tracks for the rollers 97. The forward ends of the member 99 bear extensions 100, respectively, which are pivotally mounted on a cross-rod 101 and held in spaced relation by a spacing sleeve 102, and the rear ends of said members are connected by a plate 103, which may be riveted or otherwise secured thereto, said cross-rod connecting the plates 6 and 7 and being supported thereby. The rack bar 94 stands in the same vertical plane with a gear 104, which is rigidly mounted on the drum shaft 11, and is held normally out of engagement with said gear by a pair of links 105, which links may have their lower ends pivotally attached at 106 to the members 99, respectively, near the rear ends of the latter and their upper ends pivoted at 107 to a pair of arms 108, respectively, rigidly mounted on a rock-shaft 109, which is revolubly supported by the plates 6 and 7. An arm 110 also rigidly mounted on shaft 109 has the upper end of a link 111 pivoted at 112 thereto, the lower end of said link being pivoted at 113 to the arm 114 of a bell-crank 115, which is rotatably mounted on the shaft 70. A pin 116 borne by the other arm 117 of said bell-crank has an antifriction roller 118 revolubly mounted thereon, which roller extends into and rides in a cam groove 119 in the side of the member 88 opposite that in which the cam groove 87 is formed. The cam groove 119 is arranged so that, while the shaft 89 is rotated the portion of a revolution necessary to cause the roller 86 to travel through the first eccentric portion of the cam groove 87 and thereby effects the rocking of the bell-crank 69 clockwise, Fig. 4, as hereinabove described, whereby the arm 82 of said bell-crank causes the link 92 to pull the rack bar 94 and its carriage toward the rear of the machine, the roller 118 travels through a concentric portion of the cam groove 119 and thereby holds the members 99 in their initial position through the intermediation of bell-crank 115, link 111, arm 110, shaft 109, arms 108, and links 105, so as to allow the rack bar 94 to be moved toward the rear of the machine without engaging the teeth of the gear 104. While the roller 86 travels through the first concentric portion of the cam groove and thereby causes the arm 82 of bell-crank 69 to hold the rack bar 94 and its carriage temporarily in the position to which same have been moved as just described, the roller 118 travels through an eccentric portion of the cam groove 119 and thereby rocks the bell-crank 115 counter-clockwise, Fig. 3, whereby the arm 114 of the latter rocks the shaft 109 clockwise through the medium of link 111 and arm 110, causing the arms 108 to pull the links 105 upwardly so as to raise the rear ends of the members 99, with the result of raising the rack bar 94 into operative engagement with the gear 104. The roller 118 then travels through a second concentric portion of the cam groove 119 and thereby causes the members 99 to hold the rack bar 94 in operative engagement with the gear 104 through the intermediary of bell-crank 115, link 111, arm 110, shaft 109, arms 108, and links 105, during which time the roller 86 travels through the second eccentric portion of the cam groove 87 and thereby rocks the bell-crank 69 counter-clockwise, Fig. 4, to its normal position as hereinabove described, whereby the arm 82 of the latter causes the link 92 to move the rack bar 94 and its carriage toward the front of the machine, causing the rack bar to rotate the gear 104 in the direction of the arrow, with the result of causing the drum 10 to feed a ticket or a plurality of tickets from the machine. While the roller 86 travels through the second concentric portion of the cam groove 87 and thereby holds the bell-crank 69 in its initial position, the roller 118 travels through a second eccentric portion of the cam groove 119, thereby rocking the bell-crank 115 clockwise to its normal position, with the result that the arm 114 of the latter lowers the rear ends of the members 99 to their initial position through the medium of link 111, arm 110, shaft 109, arms 108, and links 105, thus restoring the rock bar 94 to its initial position out of engagement with the gear 104. Upon the completion of the travel of the roller 118 through the second eccentric portion of the cam groove 119, said roller is left in its normal position in the entrance of the first concentric portion of said cam groove. A cross-rod 120, which is supported by the plates 6 and 7, is located directly over the rear ends of the members 99, so as to form a stop for the latter when same are raised as hereinabove described.

A lever 121 has one end thereof pivotally mounted on the cross-rod 101 preferably adjacent to the extension 100 of one of the members 99 and spaced from the plate 6 by a spacing sleeve 102, the free end of said lever being arranged to extend above the gear 104 and being provided with a tooth 122 or a plurality of such teeth. A link 123 having its ends pivotally attached at 124 and 125 to the lever 121 and one of the members 99, respectively, holds the lever normally in the position to hold its tooth or teeth 122 into interlocking engagement with teeth of the gear 104, thereby normally preventing rotation of said gear. At the same time the rear ends of the members 99 are raised to move the rack bar 94 into operative engagement with the gear 104, the link 123 raises the free end of the lever 121 and thereby moves the tooth or teeth 122 out of engagement with the gear 104, and, while the rear ends of said members are being lowered to move the rack bar 94 out of engagement with the gear 104 as hereinabove described, the link 123 pulls the free end of the lever 121 downwardly to its normal position, causing the tooth or teeth 122 to interlock with teeth of the gear 94. By this arrangement, the drum 10 is normally prevented from being rotated.

The shaft 89 extends beyond the plate 6 and through an enlarged opening 126 in the casing 1, its outer end being journaled in a bearing 127 within the casing 128, which is supported on a base 129 and secured thereto by screws 130 or other suitable means, said base being supported on and riveted or otherwise secured to the base plate 2.

A worm-gear 131, which is revolubly mounted on the shaft 89 within the casing 128, meshes with and is driven by a worm 132 rigidly mounted on the drive shaft 133, which is preferably arranged to stand in substantially a vertical position with its lower end journaled in a bushing 134, which is secured in an opening 135 in the bottom of the casing 128 by screws 136 or other suitable means, and its upper end journaled in a bushing 137 in an opening 138 in the upper part of said casing. Said worm 132 may be spaced from the bushings 135 and 137 by washers 139 or the like.

The casing 140 of an electric motor is supported on the casing 128 and is secured thereto by screws 141 or other suitable means, the shaft 142 of the motor being disposed vertically in axial alinement with the shaft 133 and having a reduced lower end 143 which is journaled in a bushing 144 supported in an opening in a boss 145 borne by the bottom of the motor casing, there being a recess or depression 146 in the top of the casing 128 to form a seat for said boss. The lower end 143 of the shaft 142 abuts the upper end of the shaft 133 and bears a tongue 144ª, which extends into a transverse groove 145ª in the upper end of the shaft 133, thereby coupling the motor shaft 143 to the shaft 133, so as to drive the latter. The hub 147 of the worm-gear 131 extends through an opening in the cover 148 of the casing 128 and bears an annular rib 149, which fits in an annular recess 150 in the inner face of said cover, the latter being secured to said casing 128 by screws 151 or other suitable means.

An annular member 152, which is riveted or otherwise secured to the end of the hub 147 of the worm-gear 131, has a notch 153 or a plurality of such notches formed in its periphery, two notches 153 being preferably formed in said member and being located substantially diametrically opposite each other as best seen in Fig. 16.

A bell-shaped member 154, which is revolubly mounted on the shaft 89 adjacent to the member 152, carries a pair of pawls 155, which pawls are pivoted at 156 to said member 154 and are located adjacent to opposite sides of said member 152.

A spring 157, which connects the free ends of the pawls 155, tends to draw the latter toward the member 152 and thereby causes the projections 158 on said pawls to seat in the notches 153, respectively, in the member 152, thereby coupling the member 152 to the member 154 so that the latter will rotate with the worm-gear 131.

It will be observed that the sides of the notches 153 and the projections 158 converge toward the shaft 89, so that, in case there should be an overload on the shaft 89, the member 152 will force the projections 158 borne by the pawls 155 out of the notches 153 and will rotate idly.

A disk 159, which is located within the bell-shaped member 154, is mounted on the shaft 89 and is secured thereto by a pin 160 or the like, which passes through the hub 161 and said shaft, there being sufficient space left between the periphery of said disk and the inner peripheral wall 162 of the bell-shaped member 154 to allow the latter normally to rotate idly on the shaft 89.

A clutch-plate 163 is revolubly mounted on the shaft 89 within the bell-shaped member 154 and is located adjacent to the inner face of the disk 159. Each end of the clutch-plate 163 is provided with an elongated notch 164 to receive the reduced end 165 of a roller 166, which is located in a notch or recess 167 in the periphery of the disk 159, the other reduced end 165 of said roller being supported in a radially-extending slot 168 in an annular plate 169, which is revolubly mounted on the hub 161 of the disk 159 adjacent to the outer face of the latter so as to form a closure for the bell-shaped member 154, there being as many notches or recesses 167 and slots 168 as rollers 166. Each notch 167 is formed relatively deep at one end thereof and is provided with a cam surface 170, which slopes toward the peripheral wall 162 of the member 154 so as to form a tapered space 171 between same and the peripheral wall 162 of said member. By this arrangement, when the rollers 166 stand in the deep end of the notches 167 as depicted in Fig. 18, the disks 159 and 169 and the shaft 89 will remain stationary while the bell-shaped member 154 rotates with the worm-gear 131, but, when the rollers 166 are moved into the tapered spaces 171 in the manner hereinafter described, so as to become wedged between the cam surfaces 170 of the notches 167 and the peripheral wall 162 of the member 154, said rollers will thereby frictionally connect the disk 159 with the member 154, with the result of causing said disk 159 and shaft 89 to rotate with said member.

The clutch-plate 163 and the plate 169 are connected by a pin 172 or a plurality of such pins, two such pins 172 being depicted in the drawings for the purpose of illustration. The pins 172 extend through arcuated slots 173 in the disk 159 and have anti-friction rollers 174 revolubly mounted thereon, one of said pins being relatively longer than the other so as to project beyond the plate 169.

A bar or pin 175 is reciprocatively mounted in openings in the plate 6 and a bracket 176 secured to said plate by screws 177 or the like so that one end thereof projects into the path of rotation of the outer end of the long pin 172 and normally occupies a position above and in engagement with one side of said pin 172, thereby holding the clutch-plate 163 in such position that same not only holds the rollers 174 in the rear end of the slots 173, but, also, holds the rollers 166 normally in the deep ends of the notches 167. A spring 178 attached at one end to a projection 179 borne by the clutch-plate 163 and, also, to a pin or stud 180 borne by the disk 159 tends to rotate the clutch-plate 163 clockwise, Fig. 18, and, when the bar 175 is moved from above the long pin 172 as hereinafter described, the spring 178 rotates the clutch-plate 163 clockwise and thereby causes the latter to move the rollers 174 toward the front ends of the slots 173 and, also, to move the rollers 166 into the tapered spaces 171 until said rollers 166 become wedged between the cam surfaces 170 and the peripheral wall 162 of the member 154, whereupon the disks 159 and 169 and shaft 89 rotate with the worm-gear 131. In this way, whenever the long pin 172 is released, the disk 159 is automatically connected with the member 154, whereby the shaft 89 will continue to rotate with the latter as long as the bar 175 is held out of the path of rotation of the outer end of the long pin 172.

In order to stop the rotation of the shaft 89, the bar 175 is moved in the manner hereinafter described so as to project into the path of rotation of the outer end of the long pin 172, so that, when said pin 172 strikes the bar 175, the clutch plate 163 will be rotated counter-clockwise, Fig. 18, whereby the latter will not only move the rollers 174 to the rear ends of the slots 173, but, also, will move the rollers 166 toward the deep ends of the notches 167 so as to release said rollers 166 from their wedged engagement with the cam surfaces 170 and the peripheral wall 162 of the member 154, with the result of automatically disconnecting the disk 159 from the member 154 so as to allow the latter to rotate idly while the disk 159 and the shaft 89 remain stationary.

In order to operate the bar 175 in the manner hereinabove described, same has a stud 181 secured to one side thereof, said stud extending through an elongated notch 182 in the end of an arm 183 rigidly mounted on one end of a rock-shaft 184, which is revolubly supported by the bracket 176.

An arm 185 rigidly mounted on the other end of the rock-shaft 184 has the lower end of a link 186 pivotally attached at 187 thereto, the upper end of said link being pivoted at 188 to a member 189, which connects the lower parts of two plates 190. The plates 190 extend substantially vertically through openings in the top plate 5 of the casing 1 and have their upper ends connected by a finger-piece 191, one of said plates being located near the plate 6 and having a slot 192 to receive a stud 193, which is secured to said plate 6, so as to guide and limit the movement of the plates 190.

A spring 194 attached at one end to member 189 and at the other end to a projection 195 borne by the top plate 5 pulls upwardly upon said member so as to hold the finger-piece 191 normally in an elevated position, with the result of holding the bar 175 in the path of rotation of the outer end of the long pin 172 through the medium of plates 190, member 189, link 186, arm 185, rock-shaft 184, and arm 183. By this arrangement, when the finger-piece 191 is depressed, same causes the plates 190 to force the member 189 downwardly and with the latter the link 186 and arm 185 which, in turn, rocks the shaft 184 counter-clockwise, Fig. 1, and thereby causes the arm 183 to move the bar 175 from above the outer end of the long pin 172, so as to allow the disk 159 and shaft 89 to rotate with the member 154 as hereinabove described, but, as soon as pressure is removed from the finger-piece 191, the spring 194 returns the finger-piece 191 and parts connected therewith to their initial positions and thereby moves the bar 175 into the path of rotation of the outer end of the long pin 172 so as to stop the rotation of the disk 159 and the shaft 89 as hereinabove described.

As hereinabove stated, the return to initial position of the rack bar 94 occurs after same has been moved toward the rear of the machine and raised into engagement with the gear 104 and during its forward movement to initial position causes the gear 104 to rotate. The degree of rotation of the gear 104 depends upon how far the rack bar 94 has been moved toward the rear of the machine, such movement of said rack bar being normally limited by the engagement of the projection 196 borne by the front end of the rack bar 94 with a stop 197, so that the return to initial position of said rack bar will effect the rotation of the gear 104 to the extent necessary to cause the drum 10 to feed only one ticket 40 through the opening 43 in the top plate 5. The stop 197 is preferably reciprocatively attached to a plate 198, which is supported by a cross-rod 199 or a plurality of such cross-rods secured to the plates 6 and 7 and a rod 199ª secured to the plate 6, being provided with slots 200 to receive studs 201, which are secured to the plate 198, so as to guide and limit the movement of said stop.

A stud 202 secured to the lower end of the stop 196 extends through a slot 203 in the forward arm 204 of a lever 205, which is pivoted at 206 to the plate 198.

A spring 207 attached to the end of the arm 204 and, also, to a pin 208 secured to plate 198 tends to pull said arm upwardly and thereby holds the stop 197 normally in an elevated position so that the upper end of said stop stands in the path of movement of the projection 196 on the rack bar 94 and at a predetermined distance behind said projection.

In case it is desired to issue several tickets 40, it would be a waste of effort to repeat the operation of depressing the finger-piece 191 for each ticket, and, accordingly, under such circumstances, by means of the keys 209, mechanism about to be described can be operated by merely depressing the proper key, so as to allow the rack bar 94 to be moved a greater distance toward the rear of the machine, in order that the return to initial position of the rack bar will rotate the gear 104 and with the latter the drum 10 sufficiently to feed the desired numbers of tickets 40 through the opening 43 by a single depression of said finger-piece.

It will be understood that, while the machine is herein illustrated and described as of a certain prearranged capacity, yet same can be constructed with either a greater or less capacity, or two or more such machines in bank can be used, according to the needs of the use to which it is to be put. Thus, while the drawings illustrate four keys 209 that govern the issuance of two, three, four, and five tickets 40, respectively, as indicated by the ordinals 2, 3, 4, and 5 that may appear on the tops of said keys, yet a greater or a less number of keys may be provided as necessity requires.

The keys 209 extend through separate openings provided therefor in the top plate 5 of the casing 1 and have their lower ends pivotally attached at 210, 211, 212, and 213 to the forward ends of levers 214, 215, 216, and 217, respectively, said levers being pivotally mounted on the rod 218, which is secured to the plates 6 and 198. The rear ends of the levers 214, 215, 216, and 217 have the upper ends of links 219, 220, 221, and 222 pivotally attached at 223, 224, 225, and 226, respectively, thereto, each of said links being provided with a slot 227 adjacent to its lower end to allow a pin 228 borne by the end of the arm 229 of lever 205 to extend therethrough, which pin 228 stands normally in the lower ends of the slots 227 in said links for the purpose hereinafter described. The levers 214, 215, and 216 have openings 230, 231, and 232 formed therein near the rear ends thereof to receive pins 233, 234, and 235 borne by the stops 236, 237, and 238, respectively. Said stops 236, 237, and 238 are located directly behind the stop 197 and are predeterminedly and accurately spaced apart, being reciprocatively attached to the plate 198 by means of studs 239, which project from said plate into slots 240 in said stops 236, 237, and 238, in order to guide and limit the movement of same.

Springs 241, attached to the keys 209, respectively, and, also to a cross-rod 242 secured to the plates 6 and 7 pull upwardly upon the keys, which, in turn, tend to rotate the levers 214, 215, 216, and 217 clockwise, Fig. 4, whereby the levers 214, 215, and 216 exert a downward pressure upon the pins 233, 234, and 235, with the result of holding the stops 236, 237, and 238 in their lowest position, so that the upper ends of the latter are below the path of movement of the projection 196 on the rack bar 94. It will be evident that the pins 233, 234, and 235 limit the downward movement of the rear ends of the levers 214, 215, and 216 and thereby limit the upward movement of their respective keys 209. In order to limit the upward movement of the key 209 that is attached to the lever 217 the former is provided with a projection or shoulder 243, which is adapted to engage the lower side of the top plate 5 as best seen in Fig. 4.

When it is desired to issue two tickets 40 from the machine, the key 209 bearing the ordinal "2" is depressed sufficiently to be caught and held in its depressed position in the manner hereinafter described. The depression of said key rocks the lever 214 counter-clockwise, Fig. 4, whereby the rear end of said lever 214 pulls the link 219 upwardly and thereby rocks the lever 205 counter-clockwise, with the result that the arm 204 of the latter pulls the stop 197 downwardly so as to withdraw the upper end of the latter from the path of movement of the projection 196 on the rack bar 94. Simultaneously with the lowering of the stop 197, the pin 233 borne by lever 214 moves the stop 236 upwardly to its highest position, so that the upper end of the latter stands in the path of movement of projection 196 on the rack bar 94. The finger-piece 191 is then depressed whereupon the rack bar 94 is moved toward the rear of the machine as hereinabove described, such movement of said rack bar causing its projection 196 to pass over the top of the stop 197 until it is limited by the engagement of said projection 196 with the elevated stop 236 when the rack bar has been moved such distance toward the rear of the machine that the return of same to initial position will effect rotation of the gear 104 sufficiently to cause the drum 10 to feed two tickets 40 through the opening 43. The return of the rack bar 94 to its initial position releases the depressed key 209 in the manner hereinafter described, whereupon the spring 241 attached to said key restores same to its normal position and thereby causes said key to rock the lever 219 clockwise, Fig. 4, to its normal position, whereby the pin 233 borne by said lever lowers the stop 236 and the rear end of said lever lowers the link 219, so as to allow the pull of spring 207 to return the stop 197 to its initial position.

If it is desired to issue three tickets from the machine, the key 209 bearing the ordinal "3" is depressed sufficiently to be caught and held in its depressed position, thereby rocking the lever 215 counter-clockwise, Fig. 4, so that the pin 234 raises the stop 237 into the path of movement of the projection 196 on the rack bar 94 and the rear end of said lever raises the link 220, which, in turn, rocks the lever 205 counter-clockwise, so as to withdraw the stop 197 from the path of movement of the projection 196, after which the finger-piece 191 is depressed to effect the operation of the rack bar 94. The rack bar 94 then moves toward the rear of the machine until limited by the engagement of its projection 196 with the elevated stop 237, which engagement occurs when the rack bar has been moved toward the rear of the machine to such extent that the return of said rack bar to initial position will rotate the gear 104 sufficiently to cause the drum 10 to feed three tickets 40 through the opening 43. The return of the rack bar 94 to initial position releases the depressed key 209, which, in turn, effects the restoration of the lever 215, link 220, and lever 205 to their normal positions, with the result of raising the stop 197 and lowering the stop 237. In like manner, the depression of the key 209 bearing the ordinal "4" rocks the lever 216, which, in turn effects the lowering of the stop 197 through the medium of link 221 and lever 205, and the raising of the stop 238, so that, when the rack bar 94 is moved toward the rear of the machine, such movement of said rack bar will be limited by the engagement of its projection 196 with the stop 238 when said rack bar has been moved toward the rear of the machine to such extent that the return of same to initial position will rotate the gear 104 sufficiently to cause the drum 10 to feed four tickets 40 through the opening 43, after which the rack bar 94 releases the depressed key 209, which then returns to its initial position and thereby restores the lever 216 to its initial position, with the result of lowering the stop 238 and raising the stop 197. The depression of the key 209 bearing the ordinal "5" rocks the lever 217, which, in turn, merely rocks the lever 205 through the medium of link 222 and thereby lowers the stop 197 so as to allow the rack bar 94 to move toward the rear of the machine until such movement of said rack bar is limited by the engagement of its projection 196 with the stop 244 when said rack bar has been moved toward the rear of the machine to such extent that the return of same to initial position will rotate the gear 104 sufficiently to cause the drum 10 to feed five tickets 40 through the opening 43, after which said rack bar releases the depressed key 209 which then returns to initial position and thereby returns the lever 217 to normal position, so as to permit the spring 207 to raise the stop 197, said stop 244 being located behind the stop 238 and being riveted or otherwise secured to the plate 198.

Projections or lugs 245 borne by the plate 198 stand behind and in engagement with the stops 197, 236, 237, and 238, respectively so as to brace said stops, in order to resist the impingement of the projection 196 against said stops.

It will be observed that when the rack bar 94 is moved toward the rear of the machine until limited by the engagement with either the stop 197, 236, 237, or 238, as hereinabove described, although this stops the clockwise movement of the bell-crank 69, the plate 73, however, continues its clockwise movement, thereby moving its shoulder 84 away from the pin 81 borne by said bell-crank and stretching the spring 80. The reverse movement of the plate 73 brings the shoulder 84 back into engagement with the pin 81 and then causes the bell-crank 69 to effect the return movement of the rack bar 94 to initial position, with the result of rotating the gear 104, which, in turn, causes the drum 10 to feed a ticket 40 or a plurality of tickets through the opening 43. When, however, the rack bar 94 is moved toward the rear of the machine until limited by the engagement of the projection 196 with the stop 244, such engagement takes place at the same time that the plate 73 reaches or nearly reaches the end of its clockwise movement.

Each key 209 is provided with a projection 245, which stands normally above a transversely inclined member 246, which connects and is supported by a pair of plates 247, the latter being revolubly mounted on a cross-rod 248, which is supported by plates 6 and 7. A spring 249 attached to an arm 250 borne by one of the plates 247 and, also, to a pin 251 secured to the plate 6 tends to rock said plate 247 clockwise, Fig. 4, and thereby holds the member 246 in engagement with the keys 209. The lower side of the projection 245 is preferably beveled to conform to the transverse inclination of the member 246, so that, when a key 209 is depressed, the beveled lower side of its projection 245 engages the member 246 and thereby moves said member forwardly until said projection passes below the lower edge of said member, whereupon the pull of spring 249 causes the member 246 to move rearwardly to a position above the projection 245 on the depressed key 209, with the result of holding the latter in its depressed position until said member is moved forwardly in the manner hereinafter described to release said projection, whereupon the pull of the spring 241 that is connected to the depressed key 209 returns the latter to its initial position.

The mechanism for preventing the depression of the keys 209 after the machine has been set in operation and, also, for releasing any depressed key 209 at the completion of the ticket-feeding operation is as follows: As the rack bar 94 travels toward the rear of the machine, the forward end of the former moves out of engagement with the rod 252, which connects the plates 253 revolubly supported on the cross-rod 101. The rod 252 extends through a slot 254 in one of the plates 255, which plates 254 are revolubly mounted on the cross-rod 248 and are connected by a transversely inclined member 256, which member stands normally in front of and lower than the projections 257 borne by the keys 209.

A spring 258 attached to an arm 259 borne by one of the plates 253 and to the cross-rod 242 tends to rock said plate 253 counter-clockwise, Fig. 4, such movement of said plate being, however, normally prevented by the engagement of the forward end of the rack bar 94 with the rod 252, so that the member 256 stands normally in front of the path of movement of each projection 257, so as to permit the normal depression of any key 209. When the rack bar 94 travels toward the rear of the machine and thereby moves the forward end of same out of engagement with the rod 252, the spring 258 rocks the plates 253 counter-clockwise, Fig. 4, whereby the rod 252 causes the plates 255 to rock clockwise, thereby moving the member 256 rearwardly until the latter occupies a position in engagement with the keys 209 below the projections 257 on the latter, with the result of locking the keys 209 in their elevated positions.

In case one of the keys 209 has been depressed before the rack bar 94 moves toward the rear of the machine, the projection 257 on the depressed key 209 will occupy a position below the member 256 when the latter is moved rearwardly as just described. One of the plates 253 carries a trip 250, which is pivoted at 261 thereto. A spring 262 attached to the rear end of the trip 260 and, also, to the plate 253 holds the rear end of said trip in engagement with a projection 263 borne by said plate 253, whereby the forward end of said trip extends over a projection 264 borne by one of the plates 247.

Rocking of the plate 253 counter-clockwise as hereinabove described moves the trip 260 rearwardly, causing the forward end of said trip to ride over the projection 264, which rocks said trip clockwise until the forward end of said trip disengages said projection 264, whereupon spring 262 returns the trip to engagement with the projection 263, so as to move the forward end of said trip to a position directly behind the projection 264. The return of the rack bar 94 to initial position causes its forward end to engage the rod 252 and to move the latter forwardly to its initial position, thereby rocking the plates 253 clockwise, with the result of not only restoring the plates 255 to normal position which moves the member 256 forwardly from beneath the projections 257 on the elevated keys 209, but, also, causes the forward end of the trip 260 to engage the rear side of the projection 264 thereby rocking the plates 247 forwardly sufficiently to cause the member 246 to release the projection 245 on any depressed key 209, so as to allow the spring 241 attached to the latter to return same to its elevated position, after which the forward end of said trip disengages the projection 264, whereupon the spring 249 returns the plates 247 and member 246 to their initial positions.

In case of accidental or erroneous depression of one of the keys 209, the use of the key 265 will effect the release of same. The key 265 extends through an opening in the top plate 5 and has its lower end pivoted at 266 to an arm 267 which is revolubly mounted on the rod 218. A spring 268 attached to said key 265 and, also, to the cross-rod 242 pulls the key 265 upwardly so as to hold same normally in a raised position, such upward movement of said key being limited by the engagement of its projection 268 with the lower side of the top plate 5.

A projection 269 borne by the key 265 has its lower side beveled like the projections 245 and stands normally above member 246, so that, when the key 265 is depressed, the projection 269 will move the member 246 forwardly until the latter releases the projection 245 on any accidentally or erroneously depressed key 209, so as to allow the spring 241 to restore the latter and parts in connection therewith to their normal positions, after which the projection 269 passes below the lower edge of the member 246, which then moves rearwardly and stands above said projection 269 so as to retain the key 265 in its depressed position until the member 246 is again moved forwardly by the return of the rack bar 94 to initial position as hereinabove described. The key 265, also, bears a projection 270 like the projections 257 on the keys 209 so that, after the machine is set in operation, the member 256 will prevent the depression of said key 265 in the same manner in which it prevents the depression of any key 209. The key 265 may have the ordinal "1" indicated on its top so as to indicate that, when same has been depressed to release a key 209 as hereinabove described, only one ticket will be issued by the machine.

The knife 90 is preferably located beneath the top plate 5 of the casing 1 and is reciprocatively supported on a plate 271, which is supported on the plates 7 and 9 and secured thereto by screws 272 or other suitable means, being located in an opening 273 in a plate 274, which is supported on the plate 271. A plate 275, which is located below the plate 271 is connected to the knife 90 by a screw 276 or a plurality of such screws or the like, there being a separate slot 277 provided in the plate 271 for each screw 276 and each screw 276 being provided with a washer 278, which is located in its slot 277. The forward end of a link 279 is pivoted at 280 to the plate 275 and the rear end of said link is pivoted at 281 to an arm 282, which is rigidly mounted on shaft 109. The cutting edge of the knife 90 rests normally upon a shearing plate 283, which is secured to the plate 274 by screws 284 or other suitable means and thereby closes the opening 43 in the top plate 5. When the shaft 109 is rocked by virtue of the roller 118 traveling through the first eccentric portion of the cam groove 119 as hereinabove described, the arm 282 pulls the link 279 toward the rear of the machine, whereby said link pulls the knife 90 rearwardly out of engagement with the shearing plate 283 in order to allow a ticket or a plurality of tickets to be fed through the opening 43. After the feeding operation takes place, the roller 118 travels through the second eccentric portion of the cam groove 119 and thereby rocks the shaft 109 in the reverse direction through the medium of bell-crank 115, link 111, and arm 110, whereby the arm 282 causes the link 279 to restore the knife 90 to its normal position, with the result that the cutting edge of said knife presses the strip of tickets against the shearing edge of the plate 283 and thereby severs the issued ticket or tickets 40 from the roll.

In order to prevent the tickets 40 from following the drum 10 past the opening 43, the forward part 285 is bent to slope downwardly toward the periphery of the drum 10 so as to deflect the tickets 40 from said drum and to guide same through the opening 43, the forward end of said bent portion being preferably beveled to extend close to the periphery of the drum 10, as best seen in Fig. 11, so as to prevent the tickets from traveling by same on said drum, and having a notch 286 to allow the pins 42 to pass therethrough.

The strip of tickets 40 that passes over drum 10 is held in engagement therewith by a plate 287 or a plurality of such plates, there being preferably a pair of these plates 287 employed, which plates are located underneath a cover 288, which fits in an opening 289 in the top plate 5, and are riveted or otherwise secured thereto.

The plates 287 are preferably formed with somewhat of a triangular configuration and the edges thereof adjacent to the periphery of the drum 10 are curved so as to be substantially concentric to said drum, in order to allow the strip of tickets to pass between same and said drum and, also, to hold the strip in engagement with the latter, being held in spaced relation by a spacer 290, so as to allow the pins 42 on said drum to pass between said plates.

A plate 291, which is riveted or otherwise secured to the cover 288 adjacent to the rear end of same, bears a pair of trunnions 292, which trunnions project into slots 293 in the plates 7 and 9.

The shank of a button 294 extends through a slot 295 in the cover 288 adjacent to the forward end of the latter, and is secured to a latch 296, which is pivoted at 297 to the lower side of said cover.

A spring 298 carried by the latch 296 engages a pin 299 borne by the cover 288 and thereby presses the latch 296 forwardly, so that the lip 300 on said latch stands normally underneath and in engagement with a plate 301 riveted or otherwise secured to the plate 302, which is supported by the plates 7 and 9, said plate 301 being arranged to extend rearwardly beyond the rear edge of the plate 302 so as to form a support for the forward edge of the cover 288 when the latter is closed. By this arrangement, when the cover 288 is closed, the latch 296 locks same in such position, and, when the button 294 is moved rearwardly same causes the lip 300 of the latch 296 to release the plate 301, after which the cover may be rotated upwardly in order to move the plates 287 away from the drum 10 for the purpose of allowing a fresh strip of tickets to be placed in position on said drum.

A member 303, which is pivoted at 304 to one of the plates 287, bears a pin 305 on which a roller 306 is revolubly mounted, said roller 306 being held in engagement with the ticket strip on the drum 10 by means of a spring 307. The roller 306 is located so that it normally engages the particular ticket 40 that stands in position to be fed through the opening 43 in the manner hereinabove described, and, by this arrangement, when two or more tickets 40 remain in the machine and the drum 10 is rotated to feed all except the last ticket 40 through the opening 43, the roller 306 holds the last ticket in engagement with the drum 10 and thereby prevents same from passing through said opening until said drum is again rotated. By this arrangement, the last ticket 40 is held wholly within the machine so as to prevent the knife 90 from severing same in the wrong place.

As the supply of tickets decreases from the continuous issuing of same, it is desired to lock the drum 10 when the last ticket 40 of the roll 12 has been fed through the opening 43. A member 308 which is pivotally attached at 309 to the other plate 287, is provided with a projection 310, which is held in engagement with the strip of tickets on the drum 10 by means of a spring 311, being disposed in substantially the same plane with a plurality of slots 312 in the periphery of the drum 10. Said slots 312 are arranged in circumferential alinement and are spaced apart so that, when the drum 10 is at rest, the projection 310 occupies a position above a slot 312, but is prevented from entering said slot by reason of a ticket 40 being between the latter and said projection. When, however, the last ticket passes through the opening 43, the spring 311 causes the projection 310 borne by member 308 to enter the first slot 312 behind the last ticket thereby preventing the drum from being rotated further until a fresh strip of tickets is placed in position thereon, as hereinabove described.

In order to register the number of tickets 40 that are issued by the machine, a registering or numbering machine 313 of any ordinary construction is provided. Said registering machine may be riveted or otherwise secured to the lower side of the top plate 5 and is located beneath an opening 314 in said plate. A gear 315 borne by the shaft 316 of the registering machine meshes with a gear 317 that is driven by a gear 318 rigidly mounted on the shaft 11 of the drum 10, said gear 31 being revolubly mounted on a pin 319 secured to the plate 8. When the drum 10 is rotated so as to feed a ticket 40 or a plurality of tickets through the opening 43, as hereinabove described, the gear 318 rotates with the drum 10 and its shaft 11 and thereby rotates the shaft 316 of the registering machine 313 through the medium of gears 317 and 315, sufficiently to register same in said registering machine. The opening 314 in the top plate 5 permits the registering machine to be read through same.

For convenience in operation and, also, generally improving the appearance of this ticket-issuing and registering machine, the forward part of the top plate 5 above which the finger-piece 191 and the keys 209 and 265 stand is bent to slope downwardly as is, also, the forward part of the cover 288, the forward edge of said top plate being bent to form a rib 320, which will prevent a coin from sliding off the inclined portion of said top plate.

We claim:

1. In a machine of the character described, the combination of a revoluble drum adapted to feed a ticket strip, a reciprocatory member adapted to actuate said drum, an adjustable support for said member, and means for actuating said support to hold said member in inoperative relation with respect to said drum when said member is moved in one direction and to hold said member in operative relation with respect to said drum when said member is moved in a reverse direction.

2. In a machine of the character described, the combination of a drum adapted to feed a ticket strip, a reciprocatory member adapted to actuate said drum, and means for holding said member in operative relation with respect to said drum only while said member is being restored to initial position.

3. In a machine of the character described, the combination of a drum adapted to feed a ticket strip, a shaft supporting same, a gear borne by said shaft, a reciprocatory rack bar adapted to actuate said gear, means for actuating said rack bar, and an adjustable support for said rack bar.

4. In a machine of the character described, the combination of a drum adapted to feed a ticket strip, a shaft supporting same, a gear borne by said shaft, a reciprocatory rack bar adapted to actuate said gear, means for actuating said rack bar, an adjustable support for said rack bar, and means for actuating said support to hold said rack bar out of engagement with said gear when said rack bar is moved in one direction and to hold said rack bar in engagement with said gear when said rack bar is moved in a reverse direction.

5. In a machine of the character described, the combination of a drum adapted to feed a ticket strip, a shaft supporting same, a gear borne by said shaft, a reciprocatory rack bar adapted to actuate said gear, and a rocking member having a connection with said rack bar for actuating same.

6. In a machine of the character described, the combination of a drum adapted to feed a ticket strip, a shaft supporting same, a gear borne by said shaft, a reciprocatory rack bar adapted to actuate said gear, a rocking member having a connection with said rack bar for actuating same, and means for actuating said member.

7. In a machine of the character described, the combination of a drum adapted to feed a ticket strip, a shaft supporting same, a gear borne by said shaft, a rack bar adapted to actuate said gear, and a carriage supporting said rack bar.

8. In a machine of the character described, the combination of a drum adapted to feed a ticket strip, a shaft supporting same, a gear borne by said shaft, a rack bar adapted to actuate said gear, a carriage supporting said rack bar, and means for actuating said carriage.

9. In a machine of the character described, the combination of a drum adapted to feed a ticket strip, a shaft supporting same, a gear borne by said shaft, a rack bar adapted to actuate said gear, a carriage supporting said rack bar, means for actuating said carriage, and an adjustable track for said carriage.

10. In a machine of the character described, the combination of a drum adapted to feed a ticket strip, a shaft supporting same, a gear borne by said shaft, a rack bar adapted to actuate said gear, a carriage supporting siad rack bar, an adjustable track for said carriage, means for actuating said carriage, and means for operating said track to hold said rack bar out of engagement with said gear when said carriage is moved in one direction and to hold said rack bar in engagement with said gear when said carriage is moved in a reverse direction.

11. In a machine of the character described, the combination of a drum adapted to feed a ticket strip, a shaft supporting same, a gear borne by said shaft, a rack bar adapted to actuate said gear, a carriage supporting said rack bar and having rollers, and a track supporting said carriage and comprising a pair of pivoted members having longitudinally extending flanges between which the rollers borne by said carriage travel.

12. In a machine of the character described, the combination of a drum adapted to feed a ticket strip, a shaft supporting same, a gear borne by said shaft, a rack bar adapted to actuate said gear, a carriage supporting said rack bar and having rollers, and a track supporting said carriage and comprising a pair of pivoted members having longitudinally extending flanges between which the rollers borne by said carriage travel and means connecting the free ends of said pivoted members.

13. In a machine of the character described, the combination of a drum adapted to feed a ticket strip, a shaft supporting same, a gear borne by said shaft, a rack bar adapted to actuate said gear, a carriage supporting said rack bar, and a track supporting said rack bar and being movable toward and away from said gear.

14. In a machine of the character described, the combination of a drum adapted to feed a ticket strip, a shaft supporting same, a gear borne by said shaft, a rack bar adapted to actuate said gear, a carriage supporting said rack bar, a track supporting said rack bar and being movable toward and away from said gear, and means normally locking said gear from rotation and being operative by said track.

15. In a machine of the character described, the combination of a drum adapted to feed a ticket strip, a shaft supporting same, a gear borne by said shaft, a rack bar adapted to actuate said gear, a carriage supporting said rack bar, a track supporting said carriage and being movable toward and away from said gear, and a pivoted member adapted normally to lock said gear from rotation and having a connection with said track.

16. In a machine of the character described, the combination of a drum adapted to feed a ticket strip, a shaft supporting same, a gear borne by said shaft, a rack bar adapted to actuate said gear, a carriage supporting said rack bar, a pivoted track supporting said carriage and being movable toward and away from said gear, a pivoted member having means for normally locking said gear from rotation, and a link connecting said pivoted member and said track.

17. In a machine of the character described, the combination of a drum adapted to feed a ticket strip, a shaft supporting same, a gear borne by said shaft, a rack bar adapted to actuate said gear, a carriage for said rack bar, a track supporting said carriage and being movable toward and away from said gear, and means for actuating said carriage including a rocking member having a connection with said carriage and means for rocking said member.

18. In a machine of the character described, the combination of a drum adapted to feed a ticket strip, a shaft supporting same, a gear borne by said shaft, a rack bar adapted to actuate said gear, a carriage supporting said rack bar, a track for said carriage and being movable toward and away from said gear, and means for actuating said carriage including a rocking member, a link connecting said member and said carriage, and means for rocking said member.

19. In a machine of the character described, the combination of a drum adapted to feed a ticket strip, a shaft supporting same, a gear borne by said shaft, a rack bar adapted to actuate said gear, a carriage supporting said rack bar, a track supporting said carriage and being movable toward and away from said gear, and means for actuating said carriage including a rocking member having a connection with said carriage and an actuator for said member having a resilient connection with same.

20. In a machine of the character described, the combination of a drum adapted to feed a ticket strip, a shaft supporting same, a gear borne by said shaft, a rack bar adapted to actuate said gear, a carriage supporting said rack bar, a track supporting said carriage and being movable toward and away from said gear, and means for actuating said carriage including a rocking member having a connection with said carriage, an actuator for said rocking member having a resilient connection with same, and means for operating said actuator.

21. In a machine of the character described, the combination of a drum adapted to feed a ticket strip, a shaft supporting same, a gear borne by said shaft, a rack bar adapted to actuate said gear, a carriage supporting said rack bar, a track supporting said carriage and being movable toward and away from said gear, and means for actuating said carriage including a rocking member having a connection with said carriage, an actuator for said rocking member having a resilient connection with same, and an oscillating member adapted to operate said actuator.

22. In a machine of the character described, the combination of a drum adapted to feed a ticket strip, a shaft supporting same, a gear borne by said shaft, a rack bar adapted to actuate said gear, a carriage supporting said rack bar, a track supporting said carriage and being movable toward and away from said gear, and means for actuating said carriage including a rocking member having a connection with said carriage, an actuator for said rocking member having a resilient connection with same, an oscillating member adapted to operate said actuator, and means for operating said oscillating member.

23. In a machine of the character described, the combination of a drum adapted to feed a ticket strip, a shaft supporting same, a gear borne by said shaft, a rack bar adapted to actuate said gear, a carriage supporting said rack bar, a track supporting said carriage and being movable toward and away from said gear, and means for actuating said carriage including a rocking member having a connection with said carriage, an actuator for said rocking member having a resilient connection with same, an oscillating member adapted to operate said actuator, and a cam adapted to actuate said oscillating member.

24. In a machine of the character described, the combination of a drum adapted to feed a ticket strip, a shaft supporting same, a gear borne by said shaft, a rack bar adapted to actuate said gear a carriage supporting said rack bar, a track supporting said carriage and being movable toward and away from said gear, and means for actuating said carriage including a rocking member having a connection with said carriage, an actuator for said rocking member having a resilient connection with same, an oscillating member adapted to operate said actuator, a revoluble member having a cam groove, and a roller carried by said oscillating member adapted to ride in the cam groove in said revoluble member.

25. In a machine of the character described, the combination of a drum adapted to feed a ticket strip, a shaft supporting same, a gear borne by said shaft, a rack bar adapted to actuate said gear, a carriage supporting said rack bar, a track supporting said carriage and being movable toward and away from said gear, and means for actuating said carriage including a rocking member having a connection with said carriage, an actuator for said rocking member having a resilient connection with same and bearing a segmental rack, an oscillating member bearing a segmental rack which meshes with the segmental rack on said actuator, and means for operating said oscillating member.

26. In a machine of the character described, the combination of a drum adapted to feed a ticket strip, a shaft supporting same, a gear borne by said shaft, a rack bar adapted to actuate said gear, a carriage supporting said rack bar, a track supporting said carriage, means for actuating said carriage, and means for moving said track toward and away from said gear including a rocking member having a connection with said track and means for rocking said member.

27. In a machine of the character described, the combination of a drum adapted to feed a ticket strip, a shaft supporting same, a gear borne by said shaft, a rack bar adapted to actuate said gear, a carriage supporting said rack bar, a track supporting said carriage, means for actuating said carriage, and means for moving said track toward and away from said gear including a rock shaft, means connecting said shaft with said track, and means for rocking said shaft.

28. In a machine of the character described, the combination of a drum adapted to feed a ticket strip, a shaft supporting same, a gear borne by said shaft, a rack bar adapted to actuate said gear, a carriage supporting said rack bar, a track supporting said carriage, means for actuating said carriage, and means for moving said track toward and away from said gear including a rock shaft, means connecting said shaft with said track, an actuator having a connection with said rock shaft, and means for operating said actuator.

29. In a machine of the character described, the combination of a drum adapted to feed a ticket strip, a shaft supporting same, a gear borne by said shaft, a rack bar adapted to actuate said gear, a carriage supporting said rack bar, a track supporting said carriage, means for actuating said carriage, and means for moving said track toward and away from said gear including a rock shaft, means connecting said shaft with said track, an actuator having a connection with said rock shaft, and a revoluble member having means for operating said actuator.

30. In a machine of the character described, the combination of a drum adapted to feed a ticket strip, a shaft supporting same, a gear borne by said shaft, a rack bar adapted to actuate said gear, a carriage supporting said rack bar, a track supporting said carriage, means for actuating said carriage, and means for moving said track toward and away from said gear including a rock-shaft having a connection with said track, an actuator having a connection with said shaft and bearing a roller, and a revoluble member having a cam groove in which the roller borne by said actuator rides.

31. In a machine of the character described, the combination of a drum adapted to feed a ticket strip, a shaft supporting same, a gear borne by said shaft, a reciprocatory rack bar adapted to operate said gear and being movable into and out of engagement with same, and means for controlling the degree of reciprocatory movement of said rack bar.

32. In a machine of the character described, the combination of a drum adapted to feed a ticket strip, a shaft supporting same, a gear borne by said shaft, a reciprocatory rack bar adapted to actuate said gear and being movable into and out of engagement with same, and adjustable means for controlling the degree of reciprocatory movement of said rack bar.

33. In a machine of the character described, the combination of a drum adapted to feed a ticket strip, a shaft supporting same, a gear borne by said shaft, a reciprocatory rack bar adapted to actuate said gear and being movable into and out of engagement with same, and a stationary stop adapted to limit the reciprocatory movement of said rack bar.

34. In a machine of the character described, the combination of a drum adapted to feed a ticket strip, a shaft supporting same, a gear borne by said shaft, a reciprocatory rack bar adapted to actuate said gear and being movable into and out of engagement with same, an adjustable stop adapted to permit reciprocatory movement of said rack bar to a predetermined degree, and a stationary stop adapted to permit reciprocatory movement of said rack bar to a greater extent than said adjustable stop.

35. In a machine of the character described, the combination of a drum adapted to feed a ticket strip, a shaft supporting same, a gear borne by said shaft, a reciprocatory rack bar adapted to actuate said gear and being movable into and out of engagement with same, and adjustable stops adapted to permit reciprocatory movement of said rack bar to predetermined degrees.

36. In a machine of the character described, the combination of a drum adapted to feed a ticket strip, a shaft supporting same, a gear borne by said shaft, a reciprocatory rack bar adapted to actuate said gear and being movable into and out of engagement with same, adjustable stops adapted to permit reciprocatory movement of said rack bar to predetermined degrees, and a stationary stop adapted to permit reciprocatory movement of said rack bar to a greater extent than said adjustable stop.

37. In a machine of the character described the combination of a drum adapted to feed a ticket strip, a shaft supporting same, a gear borne by said shaft, a reciprocatory rack bar adapted to actuate said gear and being movable into and out of engagement with same, adjustable stops adapted to limit the reciprocatory movement of said rack bar, and depressible means controlling said stops.

38. In a machine of the character described, the combination of a drum adapted to feed a ticket strip, a shaft supporting same, a gear borne by said shaft, a reciprocatory rack bar adapted to actuate said gear and being movable into and out of engagement with same, adjustable stops adapted to control the reciprocatory movement of said rack bar, depressible means controlling said stops, and means releasable by the restoration of said rack bar to initial position, to permit the restoration of said depressible means to normal position.

39. In a machine of the character described, the combination of a drum adapted to feed a ticket strip, a shaft supporting same, a gear borne by said shaft, a reciprocatory rack bar adapted to actuate said gear and being movable into and out of engagement with same, adjustable stops adapted to control the reciprocatory movement of said rack bar, depressible means controlling said stops, means releasable by the restoration of said rack bar to initial position to permit the restoration of said depressible means to normal position, and means releasable by the starting of said rack bar to prevent the depression of said depressible means until said rack bar has been restored to normal position.

40. In a machine of the character described, the combination of a drum adapted to feed a ticket strip, a shaft supporting same, a gear borne by said shaft, a reciprocatory rack bar adapted to actuate said gear and bearing a projection, and adjustable stops movable into and out of the path of movement of the projection on said rack bar to limit the movement of said rack bar.

41. In a machine of the character described, the combination of a drum adapted to feed a ticket strip, a shaft supporting same, a gear borne by said shaft, a reciprocatory rack bar adapted to actuate said gear and bearing a projection, adjustable stops movable into and out of the path of movement of the projection on said rack bar to limit the movement of said rack bar, and depressible keys individually controlling said stops.

42. In a machine of the character described, the combination of a drum adapted to feed a ticket strip, a shaft supporting same, a reciprocatory rack bar adapted to actuate said gear and bearing a projection, adjustable stops movable into and out of the path of movement of the projection on said rack bar, means holding the foremost stop normally in the path of movement of the projection on said rack bar, and depressible keys for individually moving the other stops into the path of movement of the projection on said rack bar.

43. In a machine of the character described, the combination of a drum adapted to feed a ticket strip, a shaft supporting same, a reciprocatory rack bar adapted to actuate said gear and bearing a projection, adjustable stops movable into and out of the path of movement of the projection on said rack bar, means holding the foremost stop normally in the path of movement of the projection on said rack bar, depressible keys for individually moving the other stops into the path of movement of the projection on said rack bar, and means operatively connected with said keys for moving the foremost stop out of the path of movement of the projection on said rack bar.

44. In a machine of the character described, the combination of a drum adapted to feed a ticket strip, a shaft supporting same, a gear borne by said shaft, a reciprocatory rack bar adapted to actuate said gear and bearing a projection, an adjustable stop normally standing in the path of movement of the projection on said rack bar, and a stationary stop standing behind said adjustable stop.

45. In a machine of the character described, the combination of a drum adapted to feed a ticket strip, a shaft supporting same, a gear borne by said shaft, a reciprocatory rack bar adapted to actuate said gear and bearing a projection, an adjustable stop normally standing in the path of movement of the projection on said rack bar, a stationary stop standing behind said adjustable stop, and a depressible key controlling said adjustable stop.

46. In a machine of the character described, the combination of a drum adapted to feed a ticket strip, a shaft supporting same, a gear borne by said shaft, a reciprocatory rack bar adapted to actuate said gear and bearing a projection, an adjustable stop normally standing in the path of movement of the projection on said rack bar, a stationary stop standing behind said adjustable stop, a depressible key controlling said adjustable stop, and an adjustable stop intermediate said first-mentioned adjustable stop and said stationary stop.

47. In a machine of the character described, the combination of a drum adapted to feed a ticket strip, a shaft supporting same, a gear borne by said shaft, a reciprocatory rack bar adapted to actuate said gear and bearing a projection, an adjustable stop normally standing in the path of movement of the projection on said rack bar, a stationary stop standing behind said adjustable stop, a depressible key controlling said adjustable stop, an adjustable stop intermediate said first-mentioned adjustable stop and said stationary stop, and a depressible key controlling said second-mentioned adjustable stop.

48. In a machine of the character described, the combination of a drum adapted to feed a ticket strip, a shaft supporting same, a gear borne by said shaft, a reciprocatory rack bar adapted to actuate said gear and bearing a projection, an adjustable stop normally standing in the path of movement of the projection on said rack bar, a stationary stop standing behind said adjustable stop, a depressible key controlling said adjustable stop, an adjustable stop intermediate said first-mentioned adjustable stop and said stationary stop, a depressible key controlling said second-mentioned adjustable stop, and means operatively connected with said last-mentioned key for moving said first-mentioned adjustable stop out of the path of movement of the projection on said rack bar.

49. In a machine of the character described, the combination of a drum adapted to feed a ticket strip, a shaft supporting same, a gear borne by said shaft, a reciprocatory rack bar adapted to actuate said gear and bearing a projection, an adjustable stop normally standing in the path of movement of the projection on said rack bar, a stationary stop standing behind said adjustable stop, a depressible key controlling said adjustable stop, and adjustable stops intermediate said first-mentioned adjustable stop and said stationary stop.

50. In a machine of the character described, the combination of a drum adapted to feed a ticket strip, a shaft supporting same, a gear borne by said shaft, a reciprocatory rack bar adapted to actuate said gear and bearing a projection, an adjustable stop normally standing in the path of movement of the projection on said rack bar, a stationary stop standing behind said adjustable stop, a depressible key controlling said adjustable stop, adjustable stops intermediate said first-mentioned adjustable stop and said stationary stop, and depressible keys individually controlling said second-mentioned adjustable stops.

51. In a machine of the character described, the combination of a drum adapted to feed a ticket strip, a shaft supporting same, a gear borne by said shaft, a reciprotory rack bar adapted to actuate said gear and bearing a projection, an adjustable stop normally standing in the path of movement of the projection on said rack bar, a stationary stop standing behind said adjustable stop, a depressible key controlling said adjustable stop, adjustable stops intermediate said first-mentioned adjustable stop and said stationary stop, depressible keys individually controlling said second-mentioned adjustable stops, and means operatively connected with said last-mentioned keys for moving said first-mentioned adjustable stop out of the path of movement of the projection on said rack bar.

52. In a machine of the character described, the combination of a drum adapted to feed a ticket strip, a shaft supporting same, a gear borne by said shaft, a reciprocatory rack bar adapted to actuate said gear and bearing a projection, an adjustable stop normally standing in the path of movement of the projection on said rack bar, a stationary stop standing behind said adjustable stop, a depressible key controlling said adjustable stop, adjustable stops intermediate said first-mentioned adjustable stop and said stationary stop, depressible keys individually controlling said second-mentioned adjustable stops, means operatively connected with said last-mentioned keys for moving said first-mentioned adjustable stop out of the path of movement of the projection on said rack bar, and braces for all of said adjustable stops.

53. In a machine of the character described, the combination of a drum adapted to feed a ticket strip, a shaft supporting same, a gear borne by said shaft, a reciprocatory rack bar adapted to actuate said gear, adjustable means adapted to control the movement of said rack bar in one direction, and depressible keys controlling said adjustable means.

54. In a machine of the character described, the combination of a drum adapted to feed a ticket strip, a shaft supporting same, a gear borne by said shaft, a reciprocatory rack bar adapted to actuate said gear, adjustable means adapted to control the movement of said rack bar in one direction, depressible keys controlling said adjustable means, and means for latching a depressed key in a depressed position.

55. In a machine of the character described, the combination of a drum adapted to feed a ticket strip, a shaft supporting same, a gear borne by said shaft, a reciprocatory rack bar adapted to actuate said gear, adjustable means adapted to control the movement of said rack bar in one direction, depressible keys controlling said adjustable means, means for latching a depressed key in a depressed position, and means operative by the return of said rack bar to normal position to release said latching means.

56. In a machine of the character described, the combination of a drum adapted to feed a ticket strip, a shaft supporting same, a gear borne by said shaft, a reciprocatory rack bar adapted to actuate said gear, adjustable means adapted to control the movement of said rack bar in one direction, depressible keys controlling said adjustable means, and locking means operative by the starting of said rack bar in operation adapted to prevent the depression of said keys.

57. In a machine of the character described, the combination of a drum adapted to feed a ticket strip, a shaft supporting same, a gear borne by said shaft, a reciprocatory rack bar adapted to actuate said gear, adjustable means adapted to control the movement of said rack bar in one direction, depressible keys controlling said adjustable means, locking means operative by the starting of said rack bar in operation adapted to prevent the depression of said keys, and means for latching a depressed key in a depressed position.

58. In a machine of the character described, the combination of a drum adapted to feed a ticket strip, a shaft supporting same, a gear borne by said shaft, a reciprocatory rack bar adapted to actuate said gear, adjustable means adapted to control the movement of said rack bar in one direction, depressible keys controlling said adjustable means, locking means operative by the starting of said rack bar in operation adapted to prevent the depression of said keys, means for latching a depressed key in a depressed position, and means operative by the return of said rack bar to normal position to release said latching means and to restore said locking means to normal position.

59. In a machine of the character described, the combination of a drum adapted to feed a ticket strip, a shaft supporting same, a gear borne by said shaft, a reciprocatory rack bar adapted to actuate said gear, adjustable means adapted to control the movement of said rack bar in one direction, depressible keys controlling said adjustable means, means for latching a depressed key in a depressed position, and a depressible key adapted to release said latching means.

60. In a machine of the character described, the combination of a drum adapted to feed a ticket strip, a shaft supporting same, a gear borne by said shaft, a reciprocatory rack bar adapted to actuate said gear, adjustable means adapted to control the movement of said rack bar in one direction, depressible keys controlling said adjustable means, means for latching a depressed key in a depressed position, a depressible key adapted to release said latching means, and locking means operative by the starting of said rack bar in operation adapted to prevent the depression of said keys.

61. In a machine of the character described, the combination of a drum adapted to feed a ticket strip, a shaft supporting same, a gear borne by said shaft, a reciprocatory rack bar adapted to actuate said gear, adjustable means adapted to control the movement of said rack bar in one direction, depressible keys controlling said adjustable means, means for latching a depressed key in a depressed position, a depressible key adapted to release said latching means, locking means operative by the starting of said rack bar in operation adapted to prevent the depression of said keys, and means operative by the return of said rack bar to normal position to release said latching means and to restore said locking means to normal position.

62. In a machine of the character described, the combination of a drum adapted to feed a ticket strip, a shaft supporting same, a gear borne by said shaft, a rack bar adapted to actuate said gear and being movable into and out of engagement with same, a revoluble member, and means operative by said revoluble member for reciprocating said rack bar.

63. In a machine of the character described, the combination of a drum adapted to feed a ticket strip, a shaft supporting same, a gear borne by said shaft, a rack bar adapted to actuate said gear and being movable into and out of engagement with same, a revoluble member, a pivoted member operative by said revoluble member, and means operative by said pivoted member for reciprocating said rack bar.

64. In a machine of the character described, the combination of a drum, a shaft supporting same, a gear borne by said shaft, a rack bar adapted to actuate said gear, a revoluble member having cam grooves in its side faces, means operative by the cam groove in one face of said member for reciprocating said rack bar, and means operative by the cam groove in the other face of said member for moving said rack bar into and out of engagement with said gear.

65. In a machine of the character described, the combination of a drum, a shaft supporting same, a gear borne by said shaft, a rack bar adapted to actuate said gear, a revoluble member having cam grooves in its side faces, means operative by the cam groove in one face of said member for reciprocating said rack bar, means operative by the cam groove in the other face of said member for moving said rack bar into and out of engagement with said gear, and severing mechanism operative by said moving means.

66. In a machine of the character described, the combination of a drum adapted to feed a ticket strip, a shaft supporting same, a gear borne by said shaft, a reciprocatory rack bar adapted to actuate said gear, a revoluble member and means operative by said member for moving said rack bar into and out of engagement with said gear.

67. In a machine of the character described, the combination of a drum adapted to feed a ticket strip, a shaft supporting same, a gear borne by said shaft, a reciprocatory rack bar adapted to actuate said gear, a revoluble member, means operative by said member for moving said rack bar into and out of engagement with said gear, and severing means actuated by said moving means.

68. In a machine of the character described, the combination of a drum adapted to feed a ticket strip, a shaft supporting same, a gear borne by said shaft, a rack bar adapted to actuate said gear, a reciprocatory carriage supporting said rack bar, a track supporting said carriage, a revoluble member, and means operative by said revoluble member for moving said track toward and away from said gear.

69. In a machine of the character described, the combination of a drum adapted to feed a ticket strip, a shaft supporting same, a gear borne by said shaft, a rack bar adapted to actuate said gear, a reciprocatory carriage supporting said rack bar, a track supporting said carriage, and a rock-shaft having a connection with said track for moving same toward and away from said gear.

70. In a machine of the character described, the combination of a drum adapted to feed a ticket strip, a shaft supporting same, a gear borne by said shaft, a rack bar adapted to actuate said gear, a reciprocatory carriage supporting said rack bar, a track supporting said carriage, a rock-shaft having a connection with said track for moving same toward and away from said gear, and severing mechanism operatively connected with said rock-shaft.

71. In a machine of the character described, the combination of a drum adapted to feed a ticket strip, a shaft supporting same, a gear borne by said shaft, a rack bar adapted to actuate said gear, a reciprocatory carriage supporting said rack bar, a track supporting said carriage and being movable toward and away from said gear, and a stop adapted to limit the movement of said track toward said gear.

72. In a machine of the character described, the combination with means for feeding tickets from a rolled ticket strip and operating means therefor, spring-actuated means adapted to unwind part of the ticket strip preparatory to each feeding operation, a rock-shaft having a connection with said unwinding means, an arm borne by said rock-shaft and bearing a stud, a rocking member included in the operating means, and a link having a connection with said rocking member and containing a slot to receive the stud borne by said arm adapted to permit the actuation of said unwinding means before each feeding operation and to restore same to initial position during each feeding operation.

73. In a machine of the character described, the combination of a revoluble actuator therefor, a shaft supporting same, a member revolubly mounted on said shaft, automatic clutch mechanism for operatively connecting said member with said shaft, and a driver revolubly mounted on said shaft and having a releasable connection with said member for driving same.

74. In a machine of the character described, the combination of a revoluble actuator therefor, a shaft supporting same, a member revolubly mounted on said shaft, automatic clutch mechanism for operatively connecting said member with said shaft, a gear revolubly mounted on said shaft and having a releasable connection with said member, and means for driving said gear continuously.

75. In a machine of the character described, the combination of a revoluble actuator therefor, a driven member, automatic clutch mechanism for operatively connecting said member with said actuator, a driver for said driven member, and a pawl carried by said driven member having a releasable connection with said driver.

76. In a machine of the character described, the combination of a drum adapted to feed a ticket strip, a shaft supporting the same, a gear borne by said shaft, a rack bar adapted to actuate said gear, a reciprocatory carriage supporting said rack-bar, a track supporting said carriage, and an operating member having a connection with said track for moving the same toward and away from said gear.

77. In a machine of the character described, th ecombination of a drum adapted to feed a ticket strip, a shaft supporting the same, a gear borne by said shaft, means engaging the gear for actuating the same, a reciprocatory carriage supporting said gear actuating means, a track supporting the carriage, and a rock-shaft having connection with the track for moving the same toward and away from said gear.

In testimony whereof we hereunto affix our signatures in the presence of two witnesses.

WILLIAM L. SWIFT.

Witnesses:
 GLADYS WALTON,
 NANCY C. THOMAS.

EDWIN L. RELLER.

Witnesses:
 FRED V. CONLEY,
 EDWARD C. BAKER.